United States Patent
Ohba et al.

(10) Patent No.: US 10,469,829 B2
(45) Date of Patent: Nov. 5, 2019

(54) INFORMATION PROCESSOR AND INFORMATION PROCESSING METHOD

(71) Applicant: Sony Computer Entertainment Inc., Tokyo (JP)

(72) Inventors: Akio Ohba, Kanagawa (JP); Hiroyuki Segawa, Kanagawa (JP); Tetsugo Inada, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 571 days.

(21) Appl. No.: 14/397,654

(22) PCT Filed: Apr. 11, 2013

(86) PCT No.: PCT/JP2013/002481
§ 371 (c)(1),
(2) Date: Oct. 29, 2014

(87) PCT Pub. No.: WO2013/175700
PCT Pub. Date: Nov. 28, 2013

(65) Prior Publication Data
US 2015/0077520 A1    Mar. 19, 2015

(30) Foreign Application Priority Data
May 22, 2012   (JP) .................................. 2012-116993

(51) Int. Cl.
*H04N 13/239* (2018.01)
*H04N 13/128* (2018.01)
(52) U.S. Cl.
CPC ......... *H04N 13/239* (2018.05); *H04N 13/128* (2018.05)

(58) Field of Classification Search
CPC .............. A63F 13/213; H04N 13/0022; H04N 13/0239; G06T 7/593; G06T 2207/10012; G06F 3/011; G06F 3/017; G06F 3/0304
(Continued)

(56) References Cited

U.S. PATENT DOCUMENTS 8,687,041 B2 * 4/2014 Wakabayashi ......... G03B 35/10
348/36
8,922,626 B2 * 12/2014 Aoki ...................... G01C 3/085
348/36

(Continued)

FOREIGN PATENT DOCUMENTS

| CN | 102447917 A | 5/2012 |
|---|---|---|
| JP | 2005250994 A | 9/2005 |

(Continued)

OTHER PUBLICATIONS

International Preliminary Report on Patentability and Written Opinion for corresponding Application PCT/JP2013/002481, dated Dec. 4, 2014.

(Continued)

*Primary Examiner* — Sath V Perungavoor
*Assistant Examiner* — Boubacar Abdou Tchoussou
(74) *Attorney, Agent, or Firm* — Matthew B. Dernier, Esq.

(57) ABSTRACT

An information processor acquires a stereo image from an imaging device. A detection plane definition portion defines a detection plane in a three-dimensional space of a camera coordinate system of a first camera. A feature quantity calculation portion generates feature point image of left and right images. A parallax correction area derivation portion derives an area as a parallax correction area, which is obtained by moving, to a left, an area of the right image identical to the detection area of the left image. A matching (Continued)

portion performs matching for the feature point images of each area, thus deriving a highly rated feature point. A position information output portion generates information to be used by an output information generation section based on the matching result.

20 Claims, 18 Drawing Sheets

(58) Field of Classification Search
USPC .......................................................... 348/47
See application file for complete search history.

(56) References Cited

U.S. PATENT DOCUMENTS

| | | | | |
|---|---|---|---|---|
| 8,965,105 | B2* | 2/2015 | Sato | H04N 13/0022 348/43 |
| 9,344,701 | B2* | 5/2016 | Markas | H04N 13/0022 |
| 2004/0242988 | A1* | 12/2004 | Niwa | A61B 6/467 600/407 |
| 2006/0215021 | A1* | 9/2006 | Suto | H04N 13/0246 348/139 |
| 2007/0189386 | A1* | 8/2007 | Imagawa | G06T 3/0087 375/240.12 |
| 2009/0214081 | A1 | 8/2009 | Nakano | |
| 2010/0289882 | A1* | 11/2010 | Ohta | H04N 13/0497 348/51 |
| 2011/0090215 | A1* | 4/2011 | Ohta | H04N 13/275 345/419 |
| 2011/0102425 | A1* | 5/2011 | Ohta | H04N 13/275 345/419 |
| 2011/0311130 | A1* | 12/2011 | Ichimori | G01C 11/06 382/154 |
| 2012/0154544 | A1* | 6/2012 | Sato | H04N 13/0022 348/47 |
| 2012/0212580 | A1* | 8/2012 | Shikata | H04N 13/275 348/46 |
| 2012/0236119 | A1* | 9/2012 | Rhee | G01S 3/7864 348/46 |
| 2012/0293633 | A1* | 11/2012 | Yamato | G01C 11/06 348/47 |
| 2012/0306855 | A1* | 12/2012 | Aoyama | A63F 13/26 345/419 |
| 2012/0306857 | A1* | 12/2012 | Hayashida | A63F 13/5252 345/419 |

FOREIGN PATENT DOCUMENTS

| | | |
|---|---|---|
| JP | 2007281989 A | 10/2007 |
| JP | 2011102993 A | 5/2011 |
| WO | 2007050885 A2 | 5/2007 |

OTHER PUBLICATIONS

European Search Report for corresponding EP Application 13794634, 8 pages, dated Sep. 9, 2016.
Tao H et al: "A global matching framework for stereo computation". Proceedings of the Eight IEEE International Conference on Computer Vision. (ICCV). Vancouver. British Columbia. Canada. vol. 1. pp. 532-539 (Jul. 7, 2001).
Gerrits M et al: "Local Stereo Matching with Segmentation-based Outlier Rejection". Proceedings of the 3rd Canadian Conference on Computer and Robot Vision. Piscataway, NJ. USA., IEEE Computer Society, 7 Pages (Jun. 7, 2006).
International Search Report for corresponding Application PCT/JP2013/002481, dated Jun. 25, 2013.
Office Action for corresponding CN Application 2013800328607, 17 pages, dated Nov. 28, 2016.

* cited by examiner

INFORMATION PROCESSOR AND INFORMATION PROCESSING METHOD

TECHNICAL FIELD

The present invention relates to an information processor that performs processes based on a shot image and an information processing method used by the information processor.

BACKGROUND ART

In recent years, it has become common practice that a camera is incorporated in a personal computer or game console for capturing images of a user for use in a variety of forms. For example, some technologies that are commercially available today such as TV phone and video chat are designed to transmit user's images to other end in an "as-is" manner. Other technologies recognize user's motions by image analysis and use such motions as input information for games and information processing (refer, for example, to PTL 1).

Further, it has become possible in recent years to provide a better sense of realism and image representation by detecting user's motions in a three-dimensional space including a depth direction with high accuracy. Among commercially available techniques adapted for detecting a position of a target in the depth direction are those using parallax between left and right images shot by a stereo camera and others adapted to analyze a reflection time of an emitted infrared beam or an infrared image.

CITATION LIST

Patent Literature

[PTL 1]
WO 2007/050885 A2 Publication

SUMMARY

Technical Problem

Conventional technologies using a stereo camera may result in measurement results being affected by variation in imaging environment such as light source. Further, increasing a camera resolution for higher accuracy leads to dilemmas, namely, higher calculation cost and higher likelihood for response to become slower as a result thereof. On the other hand, technologies using infrared beam separately require an infrared sensor and a dedicated camera system, resulting in high manufacturing cost and large power consumption.

The present invention has been devised in light of the foregoing, and it is an object of the present invention to provide a technology that can implement information processing using target positions in a three-dimensional space with high accuracy and quick response and at low cost.

Solution to Problem

One mode of the present invention relates to an information processor. The information processor detects a position of a measurement target in a three-dimensional space using shot images. The information processor includes an image acquisition section, a detection plane definition portion, a parallax correction area derivation portion, a matching portion, and a detection result output section. The image acquisition section acquires stereo image data obtained by capturing the measurement target in parallel with first and second cameras that are arranged at a given distance from each other. The detection plane definition portion defines a detection plane in the three-dimensional space and establishes a detection area. The detection area is obtained by projecting the detection plane onto an image shot by the first camera, i.e., one of the stereo images. The parallax correction area derivation portion derives a parallax correction area in an image shot by the second camera, i.e., one of the stereo images. The parallax correction area is derived by moving the same area as the detection area in a direction of eliminating parallax by as much as a magnitude of parallax determined by a position of the detection plane in a depth direction. The matching portion performs matching between the image of the detection area of the image shot by the first camera and the image of the parallax correction area of the image shot by the second camera. The detection result output section outputs a result of matching performed by the matching portion.

Another mode of the present invention relates to an information processing method. The information processing method is used by an information processor for detecting a position of a measurement target in a three-dimensional space using shot images. The information processing method includes a step of acquiring stereo image data obtained by capturing the measurement target in parallel with first and second cameras that are arranged at a given distance from each other. The information processing method includes another step of defining a detection plane in the three-dimensional space and establishing a detection area. The detection area is obtained by projecting the detection plane onto an image shot by the first camera, i.e., one of the stereo images. The information processing method includes still another step of deriving a parallax correction area in an image shot by the second camera, i.e., one of the stereo images. The parallax correction area is derived by moving the same area as the detection area in a direction of eliminating parallax by as much as a magnitude of parallax determined by a position of the detection plane in a depth direction. The information processing method includes still another step of performing matching between the image of the detection area of the image shot by the first camera and the image of the parallax correction area of the image shot by the second camera. The information processing method includes still another step of generating an image using a result of matching and displaying the image on a display device.

It should be noted that any combinations of the above components and any conversions of expressions of the present invention between "method," "device," "system," "computer program," "recording media storing a computer program," and so on are also effective as modes of the present invention.

Advantageous Effect of Invention

The present invention implements information processing using shot images as input information at low cost and with high accuracy.

DESCRIPTION OF EMBODIMENTS

Figure 1:
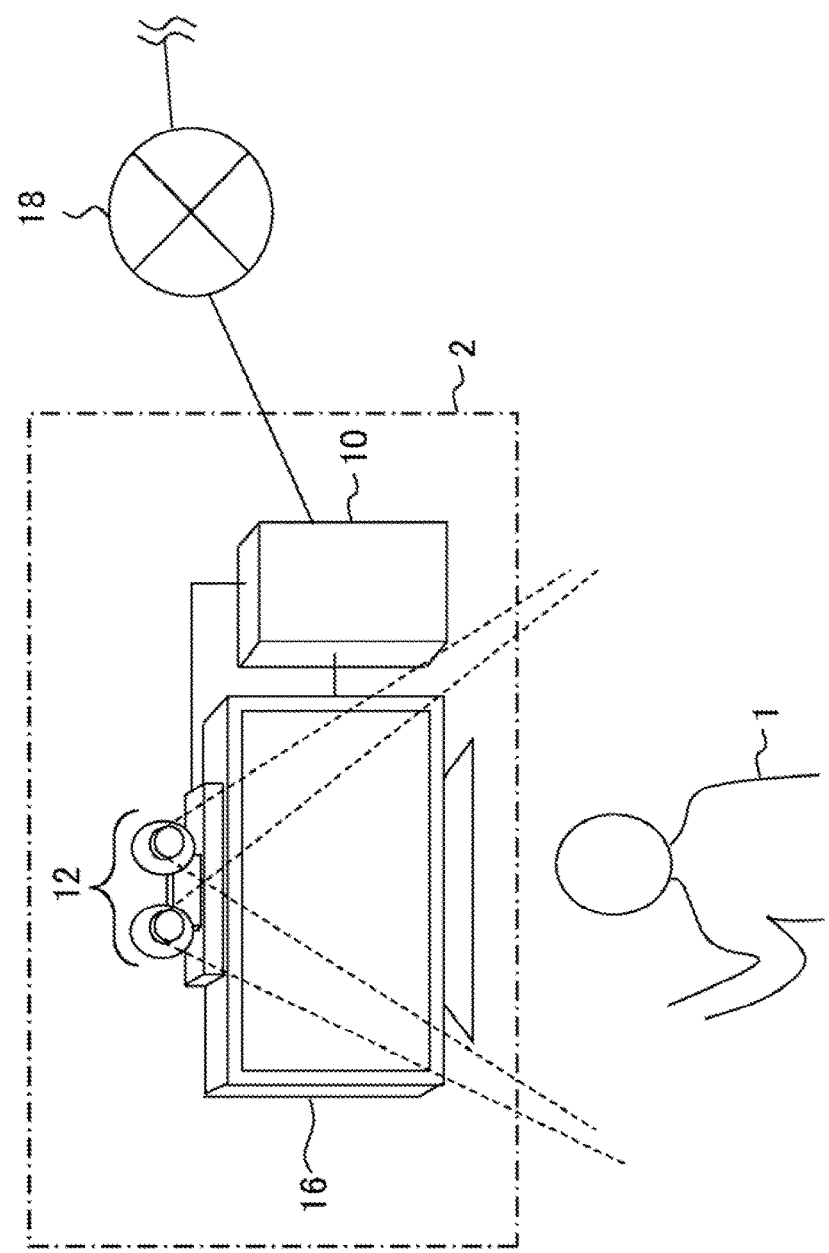
FIG. 1 is a diagram illustrating a configuration example of an information processing system to which the present embodiment is applicable.

FIG. 1 illustrates a configuration example of an information processing system to which the present embodiment is applicable. An information processing system 2 includes an imaging device 12, an information processor 10, and a display device 16. The imaging device 12 has two cameras adapted to capture a target such as a user 1. The information processor 10 handles information processing in response to a request of the user based on a shot image. The display device 16 outputs image data obtained as a result of processes performed by the information processor 10. Further, we assume that the information processor 10 can connect to a network 18 such as the Internet.

The information processor 10, the imaging device 12, the display device 16, and the network 18 may be connected together by cables. Alternatively, they may be connected together wirelessly, for example, through wireless LAN (Local Area Network). Any two of the imaging device 12, the information processor 10, and the display device 16, or all thereof may be combined integrally. Alternatively, the imaging device 12 need not necessarily be disposed on top of the display device 16. Further, there are no limitations to the number and types of subjects.

The imaging device 12 has two digital video cameras that are arranged, one on a left and another on a right with a known space therebetween. Each of the digital video cameras includes a CCD (Charge Coupled Device), CMOS (Complementary Metal Oxide Semiconductor), or other imaging element. Each of the digital video cameras captures a subject existing in the same space from the right or left position at a given frame rate. A frame pair obtained by shooting as described above will be hereinafter referred to as a "stereo image."

The information processor 10 detects a position of a subject in a three-dimensional space including an image plane and a depth direction from the cameras. A detection result is used for processes performed at subsequent stages where the subject's position and motion are used as input information. For example, the detection result is used to implement AR (Augmented Reality) that draws a virtual object flying over a shoulder or palm of the user 1 in the shot image. Alternatively, a motion of the user 1 may be tracked so as to reflect the motion in the game image or convert the motion into command input for information processing. Therefore, the application purpose thereof is not limited.

The display device 16 displays the result of the process performed by the information processor 10 as an image. The display device 16 may be a display adapted to output an image or a television set having a speaker adapted to output sounds. The display device 16 may be, for example, a liquid crystal television, plasma television, or PC display. The details of processes eventually performed by the information processor 1 and the image to be displayed are not specifically limited by the application purpose thereof as described above. Therefore, a description will be given below with primary emphasis on position detection of a target handled by the information processor 10.

Figure 2:
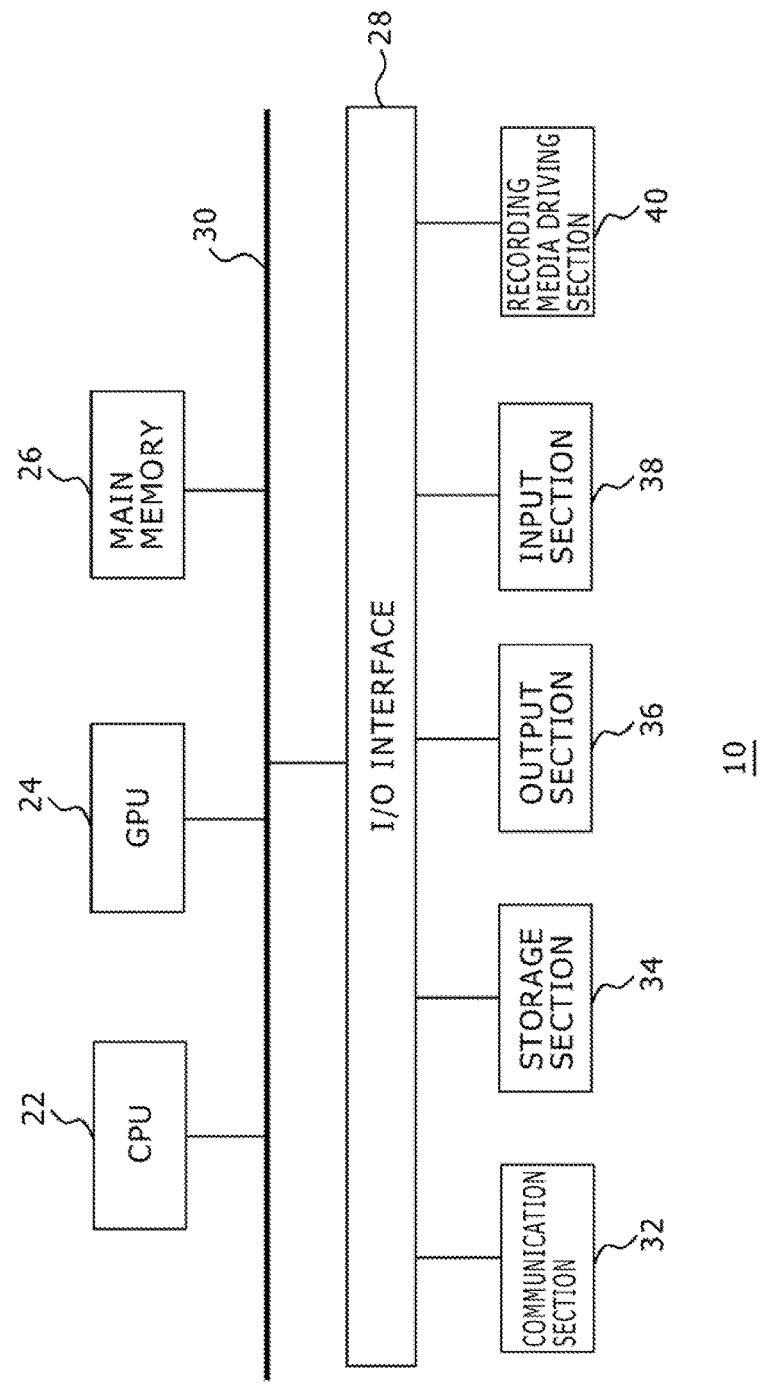
FIG. 2 is a diagram illustrating an internal circuit configuration of an information processor in the present embodiment.

FIG. 2 illustrates an internal circuit configuration of the information processor 10. The information processor 10 includes a CPU (Central Processing Unit) 22, a GPU (Graphics Processing Unit) 24, and a main memory 26. The CPU 22 performs processes associated with internal components of the information processor 10 and controls an exchange of signals based on programs such as operating system and application programs. The GPU 24 handles image processing. The main memory 26 has a RAM (Random Access Memory) and stores programs and data required for processing.

These sections are connected to each other via a bus 30. An I/O interface 28 is also connected to the bus 30. A communication section 32, a storage section 34, an output section 36, an input section 38, and a recording media driving section 40 are connected to the I/O interface 28. The communication section 32 includes a peripheral interface such as USB and IEEE1394 and wired or wireless LAN network interface. The storage section 34 includes a hard disk drive, a nonvolatile memory, and so on. The output section 36 outputs data to output devices such as the display device 16 and the speaker. The input section 38 receives data inputs from input devices such as keyboard, microphone, and the imaging device 12. The recording media driving section 40 drives a removable recording media such as magnetic disk, optical disc, or semiconductor memory.

The CPU 22 controls the whole information processor 10 by executing the operating system stored in the storage section 34. The CPU 22 also executes various programs that are either read from the removable recording media and loaded into the main memory 26 or downloaded via the communication section 32.

The GPU 24 has a geometry engine function and a rendering processor function, performing drawing in accordance with a drawing instruction from the CPU 22 and storing a display image in a frame buffer which is not shown. Then, the display image stored in the frame buffer is converted into a video signal and output, for example, to the output section 36.

Figure 3:
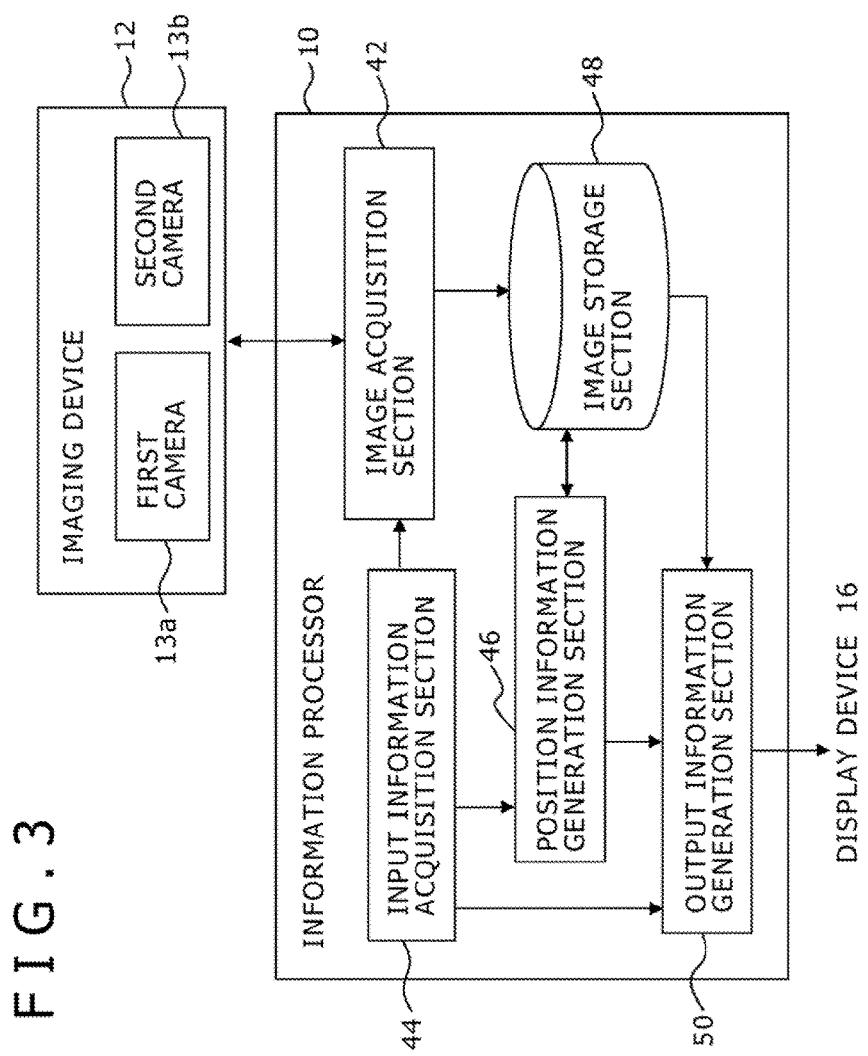
FIG. 3 is a diagram illustrating configurations of an imaging device and the information processor in the present embodiment.

FIG. 3 illustrates configurations of the imaging device 12 and the information processor 14. Each of functional blocks illustrated in FIG. 3 can be implemented in terms of hardware by the CPU, the GPU, the RAM illustrated in FIG. 2, and other processors and in terms of software by programs offering data input, data retention, image analysis, drawing and other functions. Therefore, it will be understood by those skilled in the art that these functional blocks can be implemented in various forms including hardware alone, software alone, and a combination thereof, and are not limited to any one of them.

The imaging device 12 includes first and second cameras 13a and 13b. Each of the cameras captures a subject from the left or right position at a given frame rate. The left and right positions are spaced by a known width. The stereo image obtained by shooting is transmitted to the information processor 10 whenever necessary by an ordinary technique in response to a request from the information processor 10. Here, the "subject" is not limited to a person or object existing in a center of a field of view such as the user 1 shown in FIG. 1 but may be anything in the field of view such as background, ceiling, wall, furniture, various pieces of equipment, and so on. Which one of these is to be selected as a subject is determined according to the application purpose of the detection result. A specific example will be described later.

The information processor 10 includes an image acquisition section 42, an input information acquisition section 44, a position information generation section 46, an output information generation section 50, and an image storage section 48. The image acquisition section 42 acquires a stereo image from the imaging device 12. The input information acquisition section 44 acquires an instruction input from the user. The position information generation section 46 generates subject position information based on shot images. The output information generation section 50 generates output information by performing necessary processes based on the subject position. The image storage section 48 stores stereo images supplied from the imaging device 12 and intermediate data generated, for example, by the position information generation section 46.

The input information acquisition section 44 accepts an instruction input from the user and transmits an appropriate processing request signal to other functional blocks. The input information acquisition section 44 is implemented by coordination between an ordinary input device such as button, keyboard, mouse, trackball, or touch panel and the CPU adapted to interpret the details of operation performed on the input device and generate a processing request signal.

The image acquisition section 42 acquires image data such as stereo image from the imaging device 12 in response to a request from the input information acquisition section 44, storing the image data in the image storage section 48. Images to be acquired by the image acquisition section 42 may be various in type in accordance with the process performed by the information processor 10 at a subsequent stage or information to be output. For example, only an image shot by the first camera 13a may be acquired at the same frame rate as at the time of shooting, and stereo images shot by the first camera 13a and the second camera 13b at a lower rate may be acquired. That is, the frame rates at which an image shot by the first camera 13a and that shot by the second camera 13b are acquired may be specified independently of each other.

The position information generation section 46 detects the three-dimensional position of the subject based on the stereo image data stored in the image storage section 48. At this time, the position information generation section 46 establishes a detection plane and identifies the subject position based on a positional relationship between the detection plane and the subject. The detection plane is used to detect a target in the three-dimensional space of the camera coordinate system. At this time, the position information generation section 46 identifies the positional relationship between the detection plane and the subject from the stereo image using a parallax value. The parallax value is calculated from the distance to the detection plane from the cameras (position in the depth direction). The details thereof will be described later.

The output information generation section 50 performs processes as appropriate according to the application purpose of the position detection result. Among such processes is drawing on the shot image read from the image storage section 48 based on information relating to the subject position supplied from the position information generation section 46. The process performed here is not specifically limited as described above and may be changed as appropriate in response to an instruction from the user accepted by the input information acquisition section 44. Image data obtained as a result of the process is displayed on the display device 16. Alternatively, image data may be transmitted to other device via the network 18.

Figure 4:
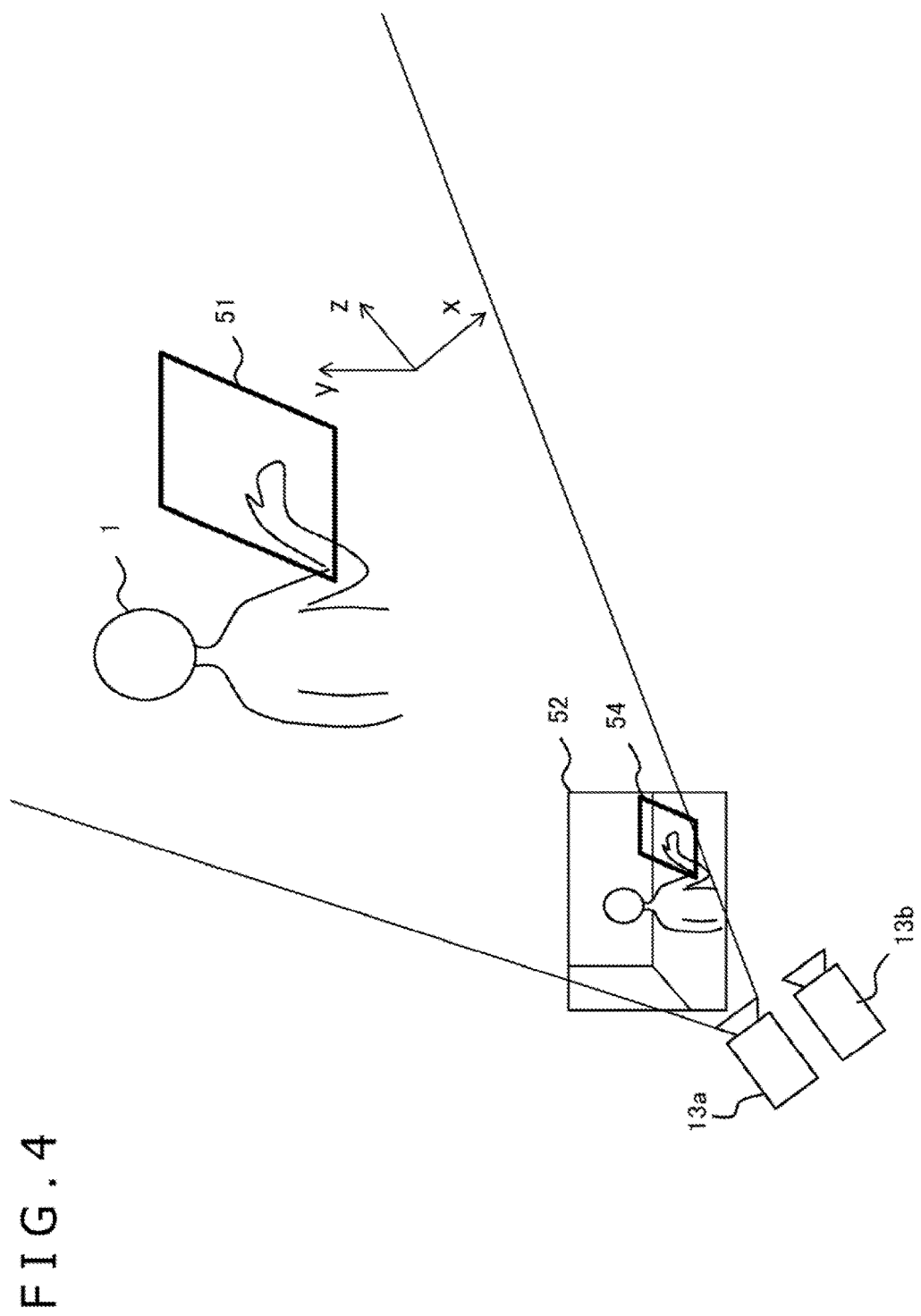
FIG. 4 is a diagram for describing a detection plane defined in the present embodiment.

FIG. 4 is a diagram for describing a detection plane defined in the present embodiment. We assume first that the user 1, a subject, is in the three-dimensional space of the camera coordinate system of the first camera 13a. A detection plane 51 is established at a body region of the user 1 whose position is to be detected. This body region is a left hand and surrounding area in the example shown in FIG. 4. That is, the detection plane 51 is a virtual plane whose vertex coordinates are defined in the three-dimensional space of the camera coordinate system. Outline and shape of the detection plane is not specifically limited, and a slope may be also specified as desired.

FIG. 4 also schematically illustrates a shot image 52 shot by the first camera 13a. The picture of the user 1 is naturally seen in the shot image 52. The position information generation section 46 projects the detection plane 51, virtually defined in the three-dimensional space, onto a plane of the shot image 52 and calculates an area 54 matching the detection plane 51. The area obtained by projecting the "detection plane" defined in a three-dimensional space onto an image plane will be hereinafter referred to as a "detection area." The projection of a model defined in a three-dimensional space onto a two-dimensional plane is an ordinary computer graphics process. Application of a computer graphics process allows for efficient position detection using a detection plane.

In the present embodiment, whether or not a subject exists on the defined detection plane is detected as position information. Although a specific technique will be described later, this makes possible two approaches, namely, (1) detecting that a new subject has come into existence on a single detection plane (has touched the detection plane), and (2) detecting the position of the subject by distributing a plurality of detection planes over a given range and extracting the detection plane on which the subject exists. For example, approach (1) can be used to produce interaction between the subject and a virtual object by drawing the virtual object as part of a front side of the defined detection plane. Approach (2) can be used for tracking the subject by distributing the detection planes in a concentrated manner based on the detection result from the previous time.

A size of the detection plane 51 may be changed according to the size of the region whose position is to be detected (hereinafter referred to as "measurement target"). In the present embodiment, redundant processes are eliminated by narrowing down measurement targets from an image as a whole and measuring the positions in the depth direction in a limited and concentrated way, thus devoting energies on necessary processes. This makes it possible to acquire necessary information with high accuracy without increasing processing load. It should be noted that the camera 13b also shoots an image similar to the shot image 52 on which the subject is seen at a misaligned position in accordance with parallax.

Figure 5:
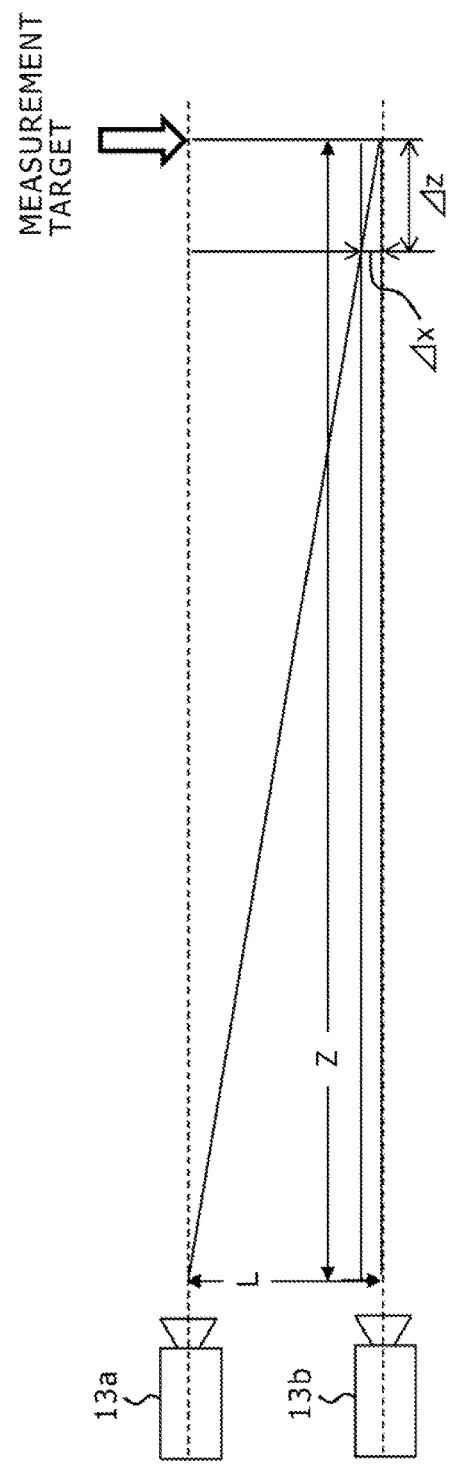
FIG. 5 is a diagram for describing a relationship between stereo image parallax and a position of a measurement target in a depth direction in the present embodiment.

A description will be given next of the principle behind the detection of a position of a measurement target using a detection plane and a stereo image. FIG. 5 is a diagram for describing a relationship between stereo image parallax and a position of a measurement target in a depth direction. The first and second cameras 13a and 13b are disposed in such a manner as to have parallel optical axes that are at a distance L from each other. We assume that the measurement target is located at a position indicated by an arrow at the far right end. This position is at a distance Z in the depth direction.

A width $\Delta x$ in the real space represented by a pixel of an image shot by each of the cameras is expressed as follows:

$$\Delta x = Z^* w/W$$

where W is a horizontal pixel count of the camera, w is a horizontal range of view field of the real space when the distance Z is 1 and is determined by a view angle.

The same measurement target captured by the cameras that are at the distance Z from each other has approximately the following parallax D in pixels in that image:

$$D = L/\Delta x = L^*(W/w)^*(1/Z) = C/Z$$

where C is a value determined by the camera and its setting and can be considered a constant during operation.

Figure 6:
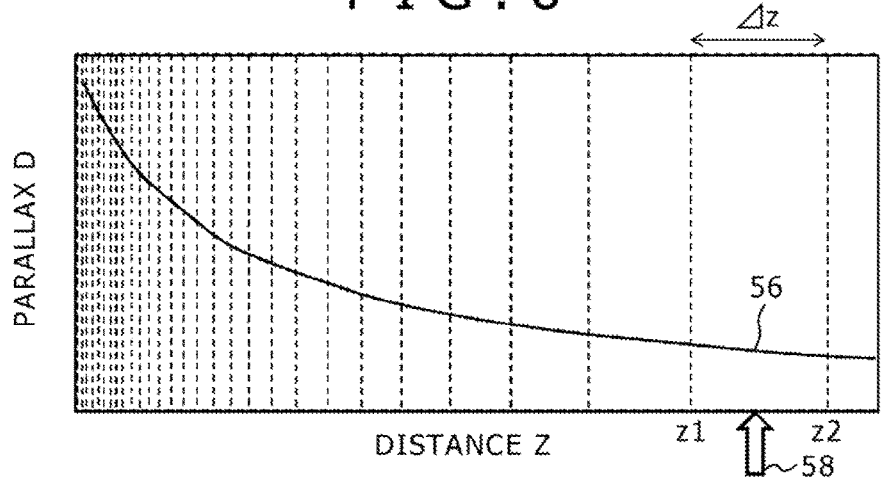
FIG. 6 is a diagram representing change in a parallax D with change in a distance Z in FIG. 5.

FIG. 6 represents change in the parallax D with change in the distance Z. As illustrated in the above formula, a curve 56 is obtained in which the parallax D is inversely proportional to the distance Z. An ordinary stereo image technique finds the distance Z in the depth direction from the parallax D of the feature point of the measurement target appearing in the stereo image using the illustrated relationship. Because an image has data in units of pixels, the parallax D is obtained in units of pixels. Because the parallax is obtained in the real space in units of $\Delta x$ in FIG. 5, $\Delta z$ in units of which the distance in the depth direction is obtained is expressed as follows from FIG. 5:

$$\Delta z = \Delta x^* Z/L = Z^{2*}(w/W)^*(1/L)$$

That is, a resolution of the distance Z by a conventional stereo image technique declines proportionally to a square of the distance Z. Each of intervals between vertical dotted lines represents $\Delta z$. For example, even if the measurement target is located at a position indicated by an arrow 58, the measurement result of the distance Z is rounded to the nearest value z1 or z2. As described above, the farther away the measurement target is located, the likelier it is for a conventional technique to produce an error in measurement results.

In the present embodiment, the distance Z is set to an arbitrary value by the detection plane, thus deriving the parallax D for the distance Z. Then, matching is performed between the detection area image of the image shot by the first camera 13a and the image obtained by moving the same area in the image shot by the second camera 13b by as much as the parallax D for evaluation. It can be concluded that the region of the subject's picture that is located at the same position in the two images, i.e., the highly rated region in terms of matching, has the parallax D, and that, by extension, the region is located at the distance Z that was initially set.

Figure 7:
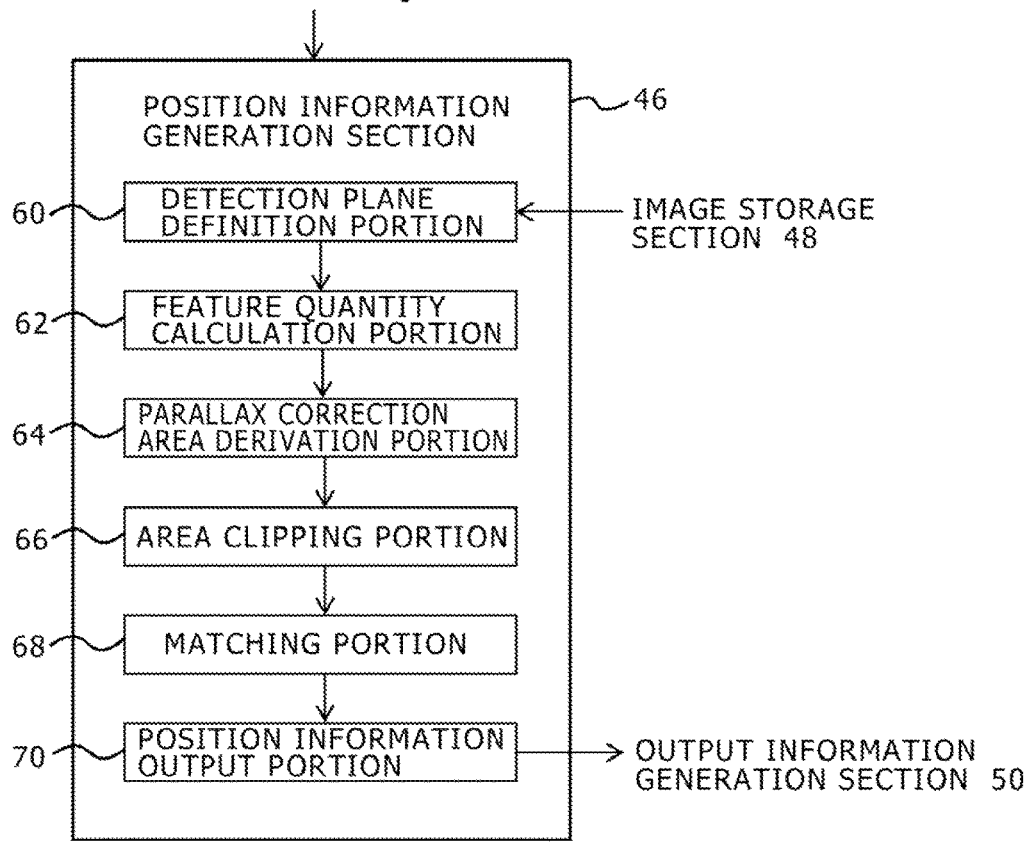
FIG. 7 is a diagram illustrating in detail a configuration of a position information generation section in the present embodiment.

FIG. 7 illustrates in detail a configuration of the position information generation section 46. The position information generation section 46 includes a detection plane definition portion 60, a feature quantity calculation portion 62, a parallax correction area derivation portion 64, an area clipping portion 66, a matching portion 68, and a position information output portion 70. The detection plane definition portion 60 defines a detection plane. The feature quantity calculation portion 62 calculates a feature quantity of an image. The parallax correction area derivation portion 64 derives an area subject to matching in consideration of parallax. The area clipping portion 66 clips the derived areas. The matching portion 68 performs matching between the clipped areas. The position information output portion 70 outputs necessary information from the matching result.

The detection plane definition portion 60 defines a detection plane in the three-dimensional space of the camera coordinate system of the first camera 13a and calculates vertex coordinates of the detection area by projecting the detection plane onto the plane of the image shot by the first camera 13a. It should be noted that, in the description given below, the images shot by the first and second cameras 13a and 13b, stereo images, will be referred to as the left and right images, respectively. However, even if the roles played by the left and right images are reversed, the same result will be obtained.

A variety of detection planes can be defined by the detection plane definition portion 60 according to the application purpose of the position detection result as described above. For example, a fixed detection plane may be specified in advance. Alternatively, information about a polygon making up a virtual object in AR may be received from the output information generation section 50 so as to generate a detection plane appropriate to the polygon information. Still alternatively, the position detection result at the previous time may be received from the position information output portion 70 so as to distribute detection planes around the detected position.

Still alternatively, the detection plane definition portion 60 may have a simple depth image generation function so as to estimate, on its own, an approximate position of the measurement target. This function may be an ordinary function adapted to generate a depth image of the screen as a whole through a stereo image technique. However, because an objective of the function is to acquire auxiliary information for achieving the present embodiment, it is only necessary to perform a simple process. More specifically, processing load is reduced by reducing the resolution of the image to be processed or establishing a large block area for matching.

The feature quantity calculation portion 62 performs a process on the left and right images to derive a given feature quantity, thus generating an image in which a region with a large feature quantity is discriminated from other regions (hereinafter referred to as a "feature point image"). For example, an edge image is generated using a Sobel filter. Alternatively, a motion difference image may be generated. Still alternatively, the area to be measured may be discriminated from other areas through pattern matching using binary pixel values. It is only necessary to process a limited area including the detection area rather than the entire image. This eliminates needless processes, thus providing reduced load.

The parallax correction area derivation portion 64 derives a parallax correction area. The parallax correction area is obtained by moving, to the left, an area of the right image shot by the second camera 13b identical to the detection area of the left image shot by the first camera 13a by as much as the parallax D appropriate to the position Z of the detection plane in the depth direction. The area clipping portion 66 clips the detection area of the left image and the parallax correction area of the right image of the left and right feature point images, thus generating two images for matching. The matching portion 68 performs block matching between the left and right images generated as described above, thus deriving a highly rated feature point, and, by extension, a feature point that is considered to exist at the same position in the images.

The region having this feature point represents the subject existing at the position of the detection plane. It should be noted that matching may be performed in units smaller than a pixel by including pixel-to-pixel values obtained by interpolating adjacent pixel values rather than in units of a pixel. Further, in the present embodiment, so long as an object or region can be detected which exists at the same position in the images subject to matching, original images, for example, may be used in an "as-is" manner for matching rather than using so-called "feature point images."

The position information output portion 70 generates information to be used by the output information generation section 50 based on the matching result, outputting that information. For example, the position information output portion 70 outputs, as information, a detection plane or a region with which or a surface area over which the measurement target comes into contact. Alternatively, the position information output portion 70 may output time-varying data by acquiring such information every frame or every several frames of a movie.

Figure 8:
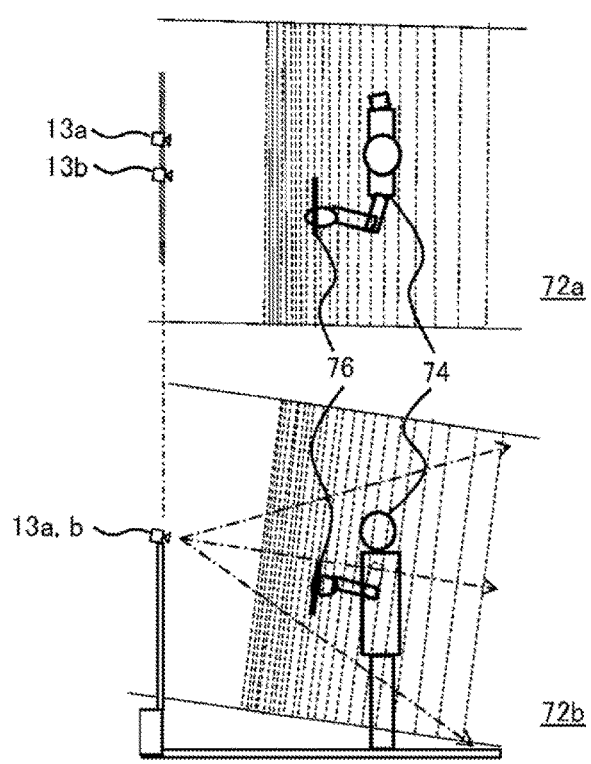
FIG. 8 is a diagram for describing an example of establishing a detection plane in the present embodiment.

A description will be given next of a specific example of establishing a detection plane and detecting a position. FIG. 8 is a diagram for describing an example of establishing a detection plane. The upper figure in FIG. 8 is a schematic diagram 72a illustrating a shooting environment as seen from above. The lower figure in FIG. 8 is a schematic diagram 72b illustrating the shooting environment as seen from side. As illustrated in FIG. 8, a person 74, a subject, is standing face to face with the first and second cameras 13a and 13b. The image as illustrated in FIG. 4 is shot in such an environment.

It should be noted that we assume that the optical axes of the first and second cameras 13a and 13b are parallel to each other, and there is no vertical misalignment as illustrated in FIG. 5. In reality, shot images may be misaligned. However, we assume that such images are corrected by an ordinary technique so that there is no misalignment. At this time, equal parallax planes are distributed as illustrated by dotted lines. Here, the term "equal parallax plane" refers to a plane on which the parallax is the same on all points of the plane. We consider a case in which a detection plane 76 is defined on an equal parallax plane in such an environment as shown in FIG. 8.

Figure 9:
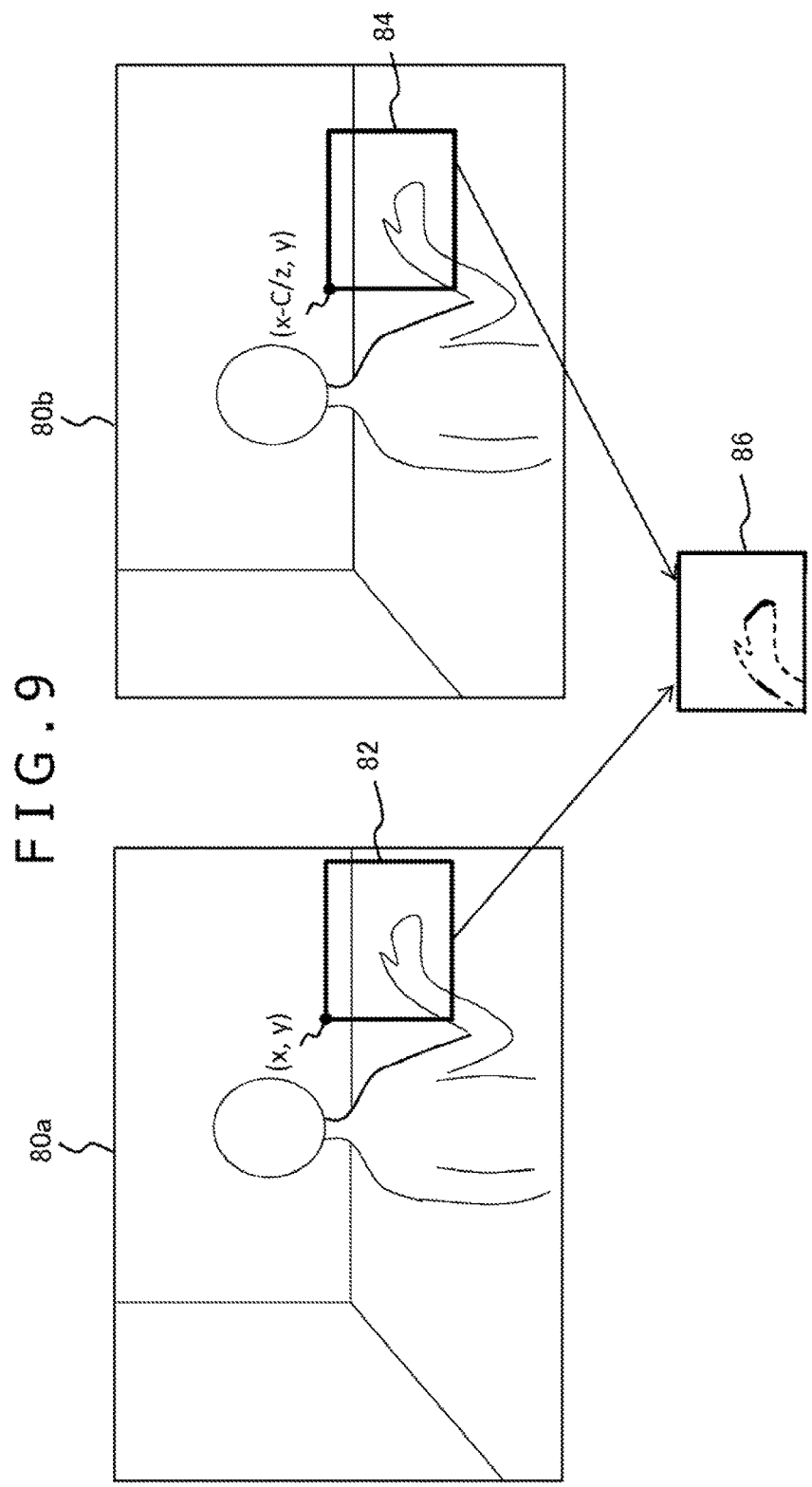
FIG. 9 is a diagram illustrating an example of a stereo image shot in an environment shown in FIG. 8.

FIG. 9 illustrates an example of a stereo image shot in the environment shown in FIG. 8. If the detection plane 76 is defined as illustrated in FIG. 8, a detection area 82 is determined. The same area 82 is obtained by projecting the detection plane 76 onto a left image 80a. Top left coordinates of the detection area 82 are assumed to be (x, y). Because the detection plane has been defined to be an equal parallax plane, the parallax is the same between the left and right images 80a and 80b in all areas. That is, an object existing on the detection plane located at the position z in the depth direction appears misaligned between the left and right images 80a and 80b by as much as the parallax $D=C/z$.

For this reason, we assume that an area whose top left coordinates are $(x-C/z, y)$ is determined as a parallax correction area 84. The parallax correction area 84 is obtained by moving the same area as the detection area 82 to the left parallel to itself. It should be noted that the measurement target appears misaligned to the left in the right image 80b. Therefore, the area is moved to the left to eliminate parallax to ensure that the measurement target is located at the same position as in the left image 80a. If the left image 80a is moved, the area is naturally moved in the opposite direction. Then, the left and right feature point images of the detection area 82 of the left image 80a and the parallax correction area 84 of the right image 80b, e.g., edge images, are clipped and subjected to matching. Then, a matching image 86 is generated in which only a highly rated feature point has a different pixel value.

In the matching image 86 of FIG. 9, an outline of the left hand of the subject, extracted as an edge, is shown by a solid line and a dotted line to facilitate the understanding. However, we assume that only a part shown by the solid line remains in a real matching image. That is, information is obtained which indicates that part of finger tips and part of a wrist are located on the detection plane shown in FIG. 8. The parts to be left in the matching image are determined by checking a matching rating against a threshold.

It is possible to control a resolution for detecting the position z in the depth direction by adjusting this threshold. It should be noted that, in FIG. 9 and FIGS. 10, 13, 14, and 15 which will be described later, the parts of the matching image with a high matching rating are shown in black, and other parts thereof are shown in white. However, the main purpose of the present invention is not limited thereto, and white and black may be reversed.

Figure 10:
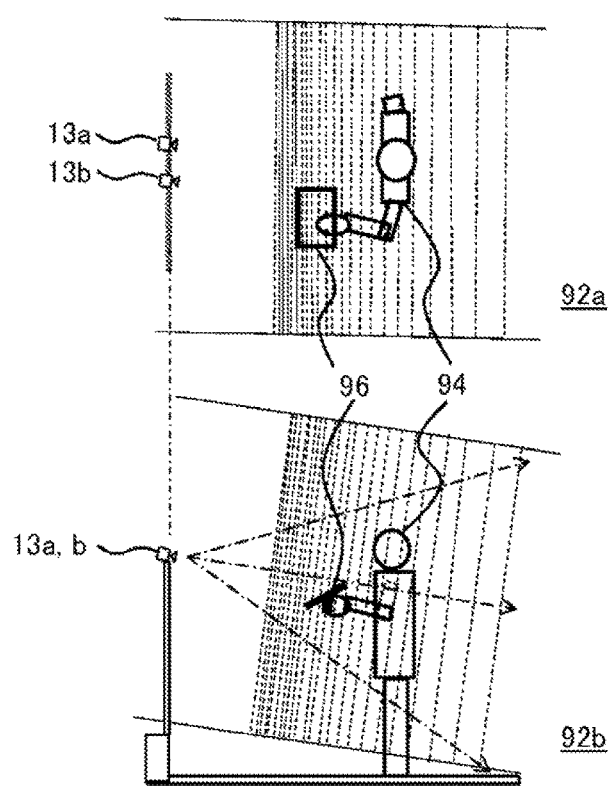
FIG. 10 is a diagram for describing another example of establishing a detection plane in the present embodiment.

FIG. 10 illustrates another example of establishing a detection plane. FIG. 10 illustrates an example in the same manner as FIG. 8 does. A person 94, a subject, is standing face to face with the first and second cameras 13a and 13b (schematic diagrams 92a and 92b). A detection plane was defined on an equal parallax plane in FIG. 8. In FIG. 10, however, the case is expanded so that a detection plane is tilted relative to the equal parallax planes. That is, a detection plane 96 is defined without regards to the equal parallax planes.

Figure 11:
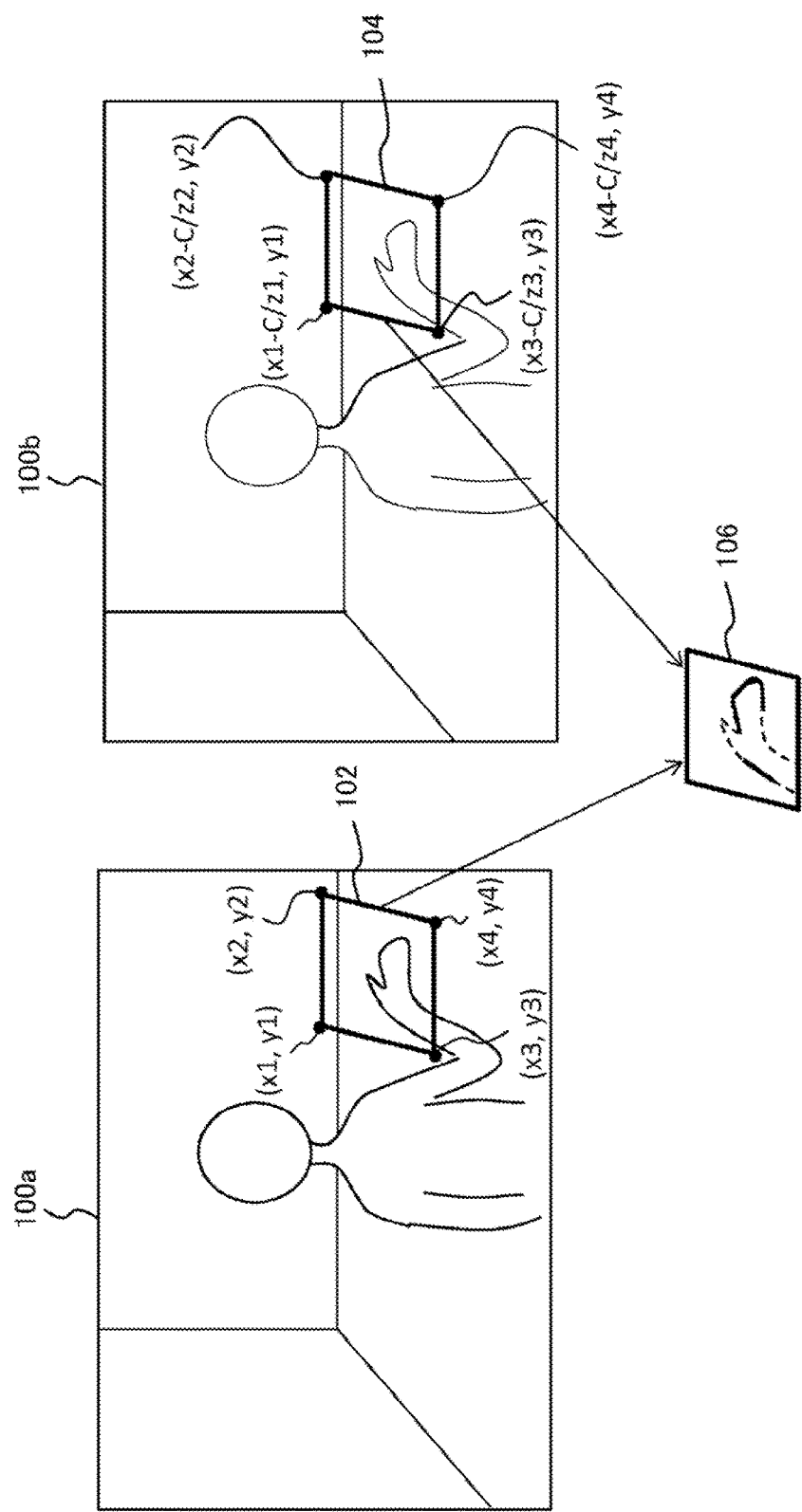
FIG. 11 is a diagram illustrating an example of a stereo image shot in an environment shown in FIG. 10.

FIG. 11 illustrates an example of a stereo image shot in the environment shown in FIG. 10. As illustrated in FIG. 10, when the detection plane 96 is defined, a detection area 102 of a left image 100a is determined. In this example, the detection plane 96 is defined independently of the equal parallax planes. Therefore, a distance from the cameras to the detection plane 96, and by extension, a parallax, is not necessarily the same over the entire area of the image. Therefore, a proper misalignment amount is applied to the entire area by manipulating all vertex coordinates of the detection area independently.

More specifically, vertex coordinates of the detection area 102 of the left image 100*a* are denoted by (x1, y1), (x2, y2), (x3, y3), and (x4, y4), and distances from the camera to the vertices of the detection plane are denoted by z1, z2, z3, and z4 as illustrated in FIG. 11. Then, vertex coordinates of a parallax correction area 104 of a right image 100*b* are (x1−C/z1, y1), (x2−C/z2, y2), (x3−C/z3, y3), and (x4−C/z4, y4).

The area having these vertex coordinates is clipped, thus generating a matching image 106 in the same manner as described with reference to FIG. 9. It should be noted, however, that, in this case, the detection area 102 and the parallax correction area 104 may be in different shapes. Therefore, the area clipping portion 66 scales the clipped areas up or down, thus producing images of the same shape and size for matching. This process is comparable to reading texture and pasting a desired polygon in computer graphics process and can be efficiently performed by using the GPU.

It should be noted that the matching image 106 of FIG. 11 generated as described above has more feature points remaining than the matching image 86 shown in FIG. 9. It is clear from this result that the left hand of the subject has an angle closer to the tilt of the detection plane defined in FIG. 10. Further, although a single detection plane was defined in FIG. 10, the details of the process are the same even if a plurality of detection planes are defined in arbitrary directions. Therefore, it is easy to define a detection plane to suit the polygon of a virtual object. The technique of the present embodiment is particularly compatible with the representation of such an interaction between a virtual object and a subject.

Figure 12:
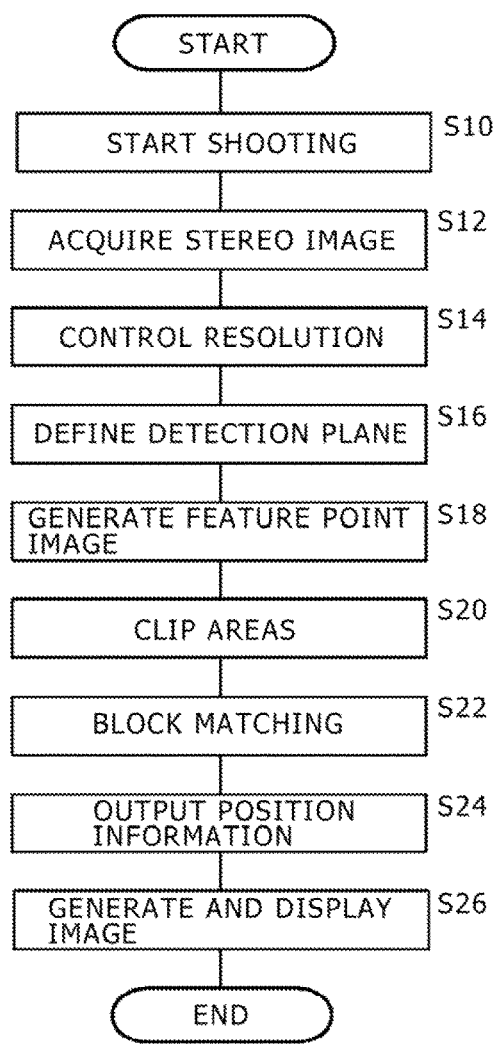
FIG. 12 is a flowchart illustrating a sequence of processes associated primarily with position detection of all information processing performed by the information processing system in the present embodiment.

A description will be given next of the operation of the information processing system 2 that can be implemented by the configurations and components described above. FIG. 12 is a flowchart illustrating a sequence of processes associated primarily with position detection of all information processing tasks performed by the information processing system 2. First, when the user specifies the details of the process and gives an instruction to start the process, the imaging device 12 begins to capture the subject (S10). The information processor 10 sequentially acquires frame image data obtained by shooting as described above (S12). This image includes stereo images at a given rate. It should be noted that the steps from S12 to S24 are repeated at the given rate.

The detection plane definition portion 60 of the information processor 10 changes the resolution of the acquired stereo images as necessary (S14). For example, if the resolution of the stereo image acquired from the imaging device 12 is excessively high for the requested accuracy of position detection, this may result in needless processing load or noise. Therefore, the stereo image resolution suitable for the requested accuracy is determined in advance for each application purpose of the detection result so that the image resolution is changed.

Next, the detection plane definition portion 60 defines a detection plane in the coordinate system of the first camera 13*a* (S16). A shape, size, number, position, tilt and so on of the detection plane can be specified in various ways, for example, according to the application purpose of the detection result and the size of the measurement target. The definition of an appropriate detection plane may be determined in advance depending on an anticipated shooting environment or measurement target. Alternatively, the detection plane may be changed adaptively, for example, according to a position of a depth image or virtual object generated in a simplified manner or the detection result at the previous time.

Next, the feature quantity calculation portion 62 performs edge extraction and other processes on the area of a given range including the detection area obtained by projecting the detection plane onto the left image and the similar area of the right image, calculating a given feature quantity and generating feature point images (S18). Next, the parallax correction area derivation portion 64 derives the vertex coordinates of the parallax correction area determined according to the position of the detection plane in the depth direction for the right image. The same section 64 clips the detection area of the left feature point image and the parallax correction area of the right feature point image (S20). At this time, the parallax correction area derivation portion 64 generates an image of the same shape and size from the clipped areas for matching.

The texture mapping function of the GPU is applicable to this process by considering each of the areas to be clipped as texture as described above. At this time, it is possible to adjust expansion and contraction of the clipped areas by assigning a proper value to the texture filter, allowing to substantially control the unit areas to be compared during block matching, i.e., the surface area of the block area in which the sum of differences in brightness, for example, is to be found. Reducing the surface area of the block area makes it possible to rate the matching in smaller units, thus providing higher resolution of the position in the depth direction. Thus, it is possible to control the resolution of the position in the depth direction by assigning a proper value to the texture filter.

The resolution of the position on an image plane (xy plane) can also be controlled by adjusting the resolution of the matching image to which the clipped areas are pasted. As described above, the present embodiment can readily eliminate needless processes while at the same time ensuring sufficient accuracy of each of parameters by adjusting the settings in each process step using the GPU. It should be noted that the processes in S20 and S18 may be performed in opposite order. That is, the detection area of the left image and the parallax correction area of the right image may be clipped first, which is followed by generating an image of the same size and shape through texture mapping, extracting a feature point, and using the resultant feature point image for matching.

Next, the matching portion 68 performs block matching on the image for matching to which the detection area of the right image and the parallax correction area of the left image have been pasted, thus generating a matching image in which only feature points with high matching ratings are remaining (S22). Then, the position information output portion 70 generates, based on the matching image, necessary information and outputs that information (S24). Such information includes whether the measurement target is in contact with the detection plane and the position of the measurement target in the three-dimensional space.

The output information generation section 50 draws a virtual object or updates the game image based on the information supplied from the position information output portion 70 (S26). It should be noted that the updating of the image in S26 may be performed at a different rate from that for the position detection process performed from S12 to S24. For example, the image may be updated at a rate equivalent to the frame rate of the movie shot by the imaging device 12.

An ordinary stereo image technique identifies corresponding points between stereo images by moving a search window and acquires the position of the measurement target in the depth direction based on the parallax therebetween. On the other hand, the present embodiment misaligns the images by as much as parallax in advance and determines whether or not the feature points of the same shape are located at the same position, thus determining whether or not the measurement target is located at the position of the detection plane. This reduces processing load as compared to finding corresponding points by moving a search window. At the same time, it is possible to prevent decline in accuracy of the position in the depth direction as a result of rounding in units of pixels.

On the other hand, because a measurement result is produced by a single matching operation, the following problem may arise. That is, it is likely that, despite being located at a position different from the detection plane, but because of periodic patterns or structures of the subject, the same pattern or feature point may be accidentally located again at the same position when the images are moved by as much as the parallax. In this case, that pattern or feature point may also receive a high matching rating, thus resulting in erroneous determination that the subject is located on the detection plane.

Figure 13:
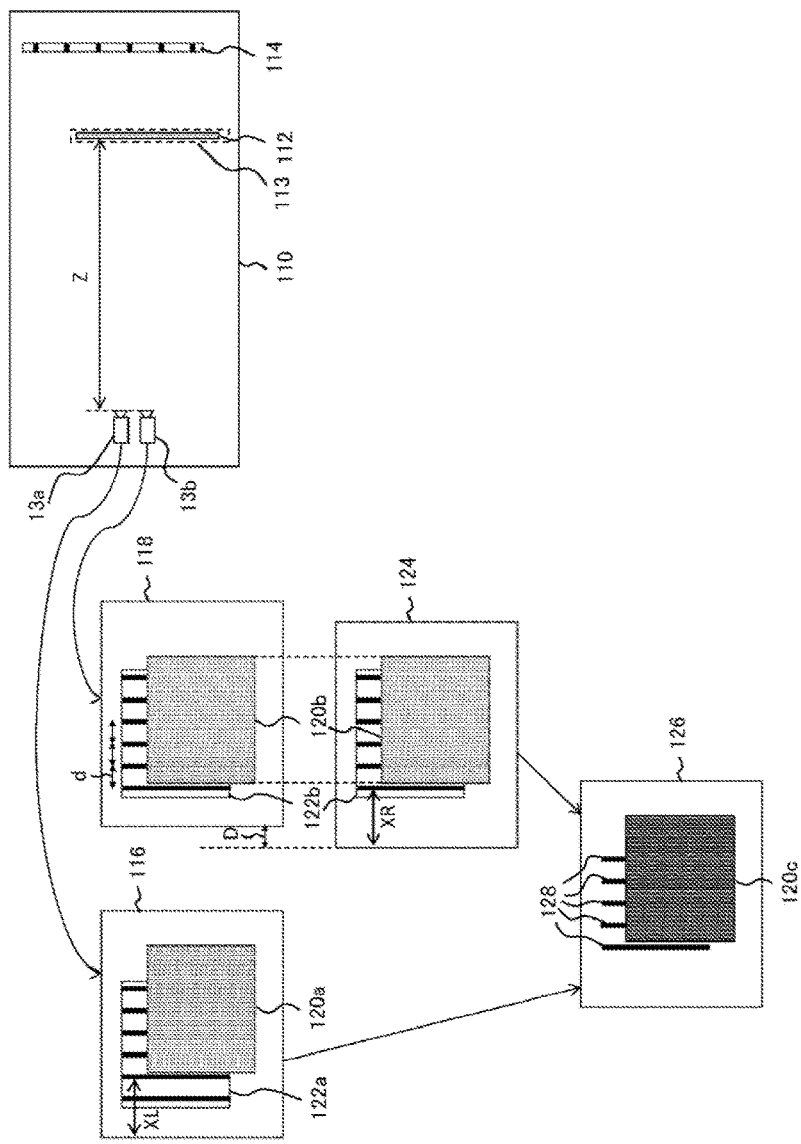
FIG. 13 is a diagram for describing erroneous determination caused by a presence of an object having periodic structures.

FIG. 13 is a diagram for describing erroneous determination caused by a presence of an object having periodic structures. Top right diagram in FIG. 13 is a top view 110 illustrating a positional relationship between the first and second cameras 13a and 13b and a measurement target 112 in a shooting environment. We assume that a background object 114 having periodic structures is located in a back of the measurement target 112 in the shooting environment.

In this environment, the detection area images shot by the first and second cameras 13a and 13b are left and right images 116 and 118, respectively. As illustrated in FIG. 13, a picture 122a of the background object 114 appears in a back of a picture 120a of the measurement target 112 in the left image 116. Similarly, a picture 122b of the background object 114 appears in a back of a picture 120b of the measurement target 112 in the right image 118. The measurement target 112 is closer to the cameras than the background object 114. Therefore, the stereo image parallax is greater.

Assuming in this condition that the measurement target 112 is located on a detection plane 113 at the distance Z in the depth direction from the cameras, matching is performed between an image 124 of the parallax correction area, obtained by moving the area of the right image 118 to the left by as much as the parallax D=C/Z, and the detection area of the left image 116. However, if the background object has periodic structures such as vertical patterns arranged at intervals d, it is likely, depending on the intervals d and the parallax of the background object itself, that positions of vertical lines of the left image 116 and the parallax area correction image 124 may accidentally overlap each other.

In the example shown in FIG. 13, a horizontal position XL of the second vertical line from left in the background image 122a of the left image 116 and a position XR of the leftmost vertical line of the parallax correction area image 124 overlap each other. As a result, the positions of the vertical lines other than those at the right and left ends overlap each other, thus resulting in high matching ratings. In a matching image 126 in which only feature points with high matching ratings are remaining, therefore, not only a feature point 120c of the measurement target 112 which should be detected from the beginning but also feature points 128, part of the background object 114 not located on the detection plane 113, are detected.

Figure 14:
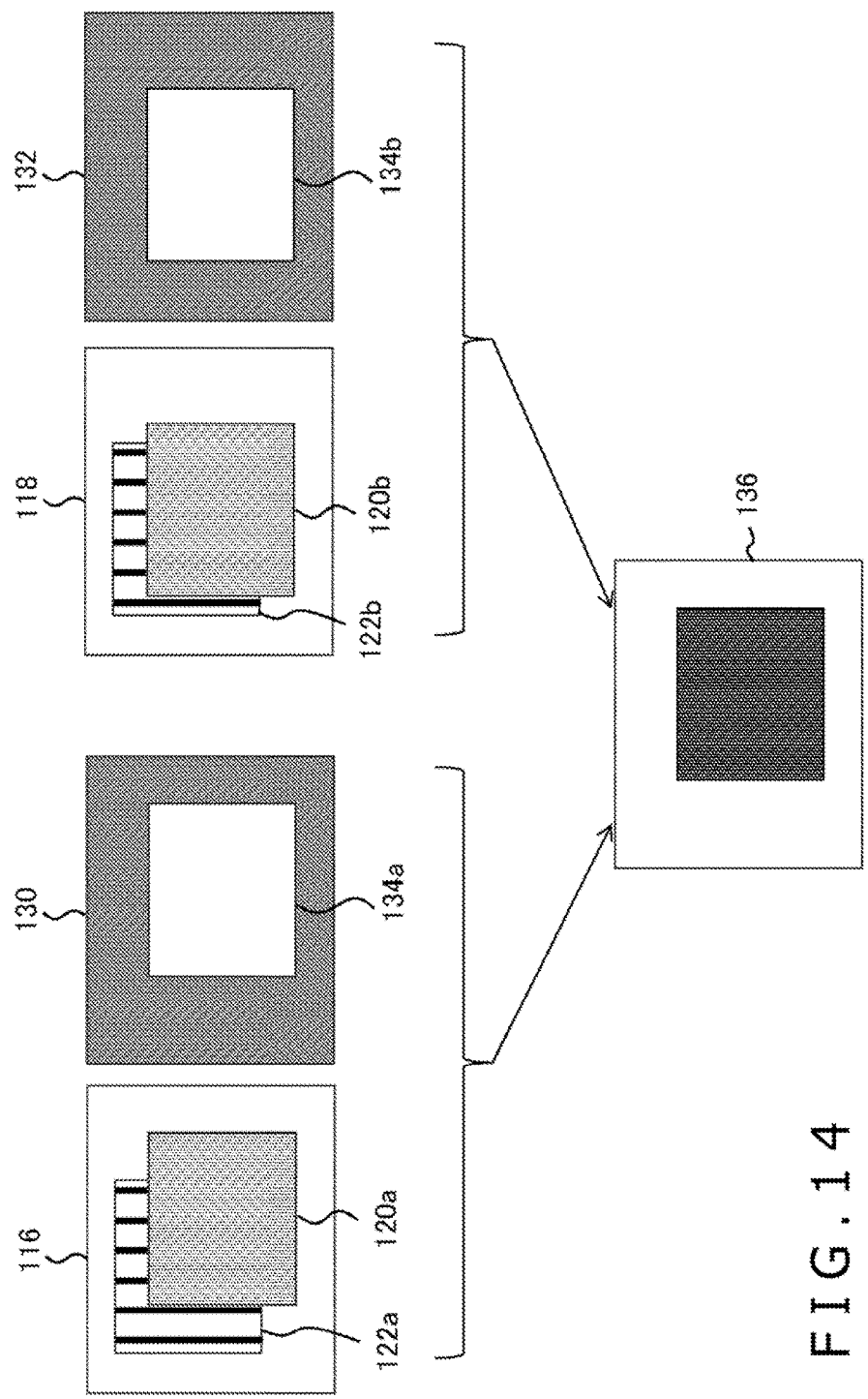
FIG. 14 is a diagram for describing a technique for preventing decline in position detection accuracy caused by the presence of periodic structures in the present embodiment.

FIG. 14 is a diagram for describing a technique for preventing decline in position detection accuracy caused by the presence of periodic structures. The left and right images 116 and 118 are the same as those shown in FIG. 13. This technique further acquires motion difference images 130 and 132 respectively for the shot right and left images. The motion difference images 130 and 132 represent the differences from the previous frame. If the measurement target moves in one way or the other, the motion difference images 130 and 132 have values in and near the images 120a and 120b of the measurement target (motion areas 134a and 134b) as illustrated in FIG. 14.

The feature quantity calculation portion 62 acquires the left and right motion difference images 130 and 132, masks the respective feature point images using the motion difference images 130 and 132, and disables the feature points other than those in the motion areas 134a and 134b of the measurement target. The matching process performed by the matching portion 68 after moving the right image 118 generates a matching image 136 free from a motionless background in the detection target.

It should be noted that, as for the masking of the feature point images using the motion difference images, the matching portion 68 may mask the matching image. In this case, the matching portion 68 may use only the motion difference image 130 of the left image. Alternatively, the area other than the measurement target may be masked based not on the motion difference image but, for example, on a foreground image or temperature distribution if the temperature of the measurement target is different from the surrounding temperature. The foreground image is obtained by extracting only the foreground using the difference in background.

Figure 15:
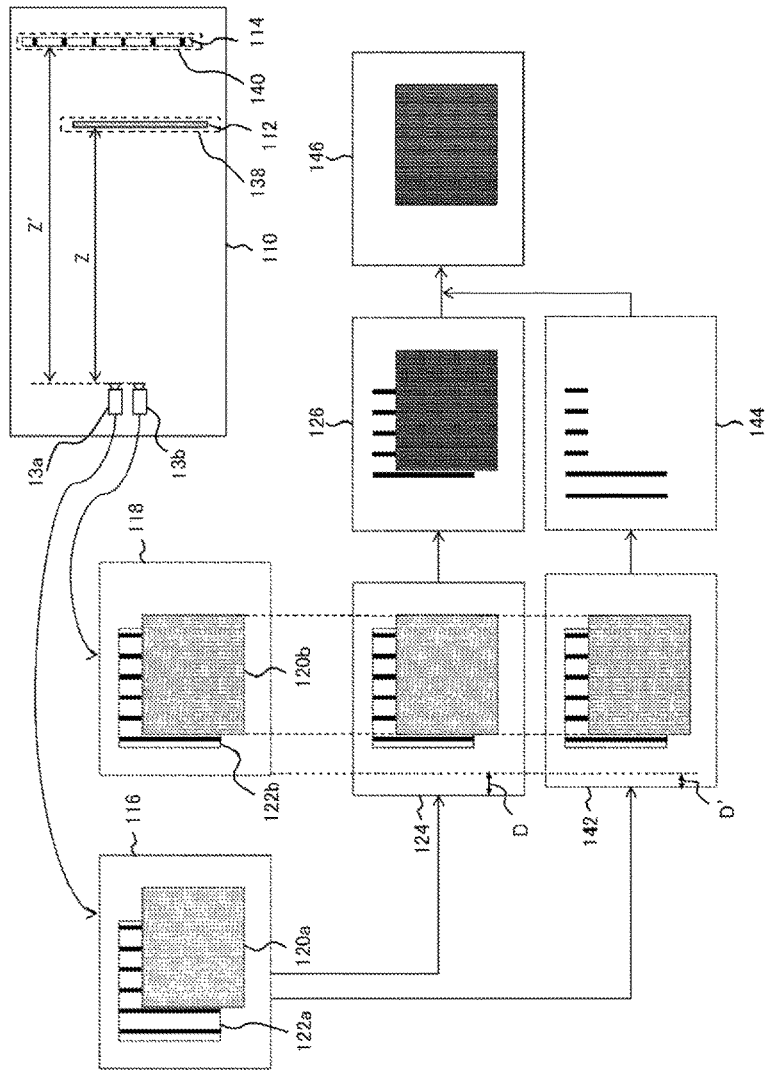
FIG. 15 is a diagram for describing another technique for preventing decline in detection accuracy caused by the presence of periodic structures in the present embodiment.

FIG. 15 is a diagram for describing another technique for preventing decline in detection accuracy caused by the presence of periodic structures. This technique defines a plurality of detection planes for different measurement targets as a target. Then, matching is performed between a plurality of parallax correction areas and the detection area of the left image. Each of the plurality of parallax correction areas is obtained by moving the right image by as much as the parallax for each of the detection planes. The measurement targets are discriminated by using a plurality of matching images, obtained by the matching, as mask images of each other.

In the example shown in FIG. 15, a first detection plane 138 having the measurement target 112 as a target and a second detection plane 140 having the background object 114 as a target are defined in the top view 110 at top right showing the shooting environment. The left and right images 116 and 118 shown in FIG. 15 are the same as those shown in FIGS. 13 and 14. The parallax correction area derivation portion 64 generates the image 124 and an image 142. The image 124 is obtained by moving the detection area of the right image by as much as the parallax D appropriate to the distance Z of the first detection plane 138 in the depth direction (same as the image 124 shown in FIG. 13). The image 142 is obtained by moving the detection area of the right image by as much as parallax D' appropriate to distance Z' of the second detection plane 140 in the depth direction.

Then, the matching portion 68 performs matching between the left image 116 and each of the two images obtained by moving the right image in different ways, i.e., the images 124 and 142. In the matching image 126 of the image 124 obtained by moving the right image by as much as the parallax D for the first detection plane 138, the feature points of the background are remaining as in FIG. 13. In a matching image 144 for the image 142 obtained by moving the right image by as much as the parallax D' for the second detection plane 140, on the other hand, only the feature points of the background are remaining because of a low matching rating of the area of the measurement target 112.

The matching portion 68 uses one of the two matching images 126 and 144 generated as described above as a mask image of the other. In the example shown in FIG. 15, the highly rated feature points in the matching image 144 obtained for the second detection plane 140 are disabled in the matching image 126 obtained for the first detection plane 138. This provides an image 146 that detects only the measurement target 112, the target of the first detection plane 138.

In the example illustrated in FIG. 15, the feature points of the measurement target 112 have already disappeared in the matching image 144 obtained for the second detection plane 140. Depending on the patterns or shape of the measurement target 112, mismatching may similarly occur, causing the feature points of the measurement target 112 to remain in the matching image 144. Therefore, the highly rated feature points in the matching image 126 obtained for the first detection plane 138 are disabled in the matching image 144 obtained for the second detection plane 140 in the same manner as described above. This allows for positive detection of only the background object 114, the target of the second detection plane 140.

Although detection planes were established using two measurement targets in FIG. 15, the number of measurement targets may be three or more. On the other hand, the first and second detection planes may be established by adding, as a preprocessing, a process of acquiring approximate depth information of the shooting space. This function can be implemented by a simplified depth image generation process described above. Further, as described next, a background position may be acquired by the position detection technique of the present embodiment so as to define a detection plane based on the background position.

The description given so far has focused on the use of a detection plane for detecting the position of a main subject such as a user. On the other hand, a detection plane defined in the present embodiment is a plane model, which makes a detection plane effective for detection of a floor, a ceiling, or a wall. The features of these so-called backgrounds in terms of motion, shape, and so on are difficult to discern. Therefore, the position detection of the backgrounds themselves has not been easy with conventional techniques. However, backgrounds are an important factor for modeling an environment or setting up an AR stage.

Figure 16:
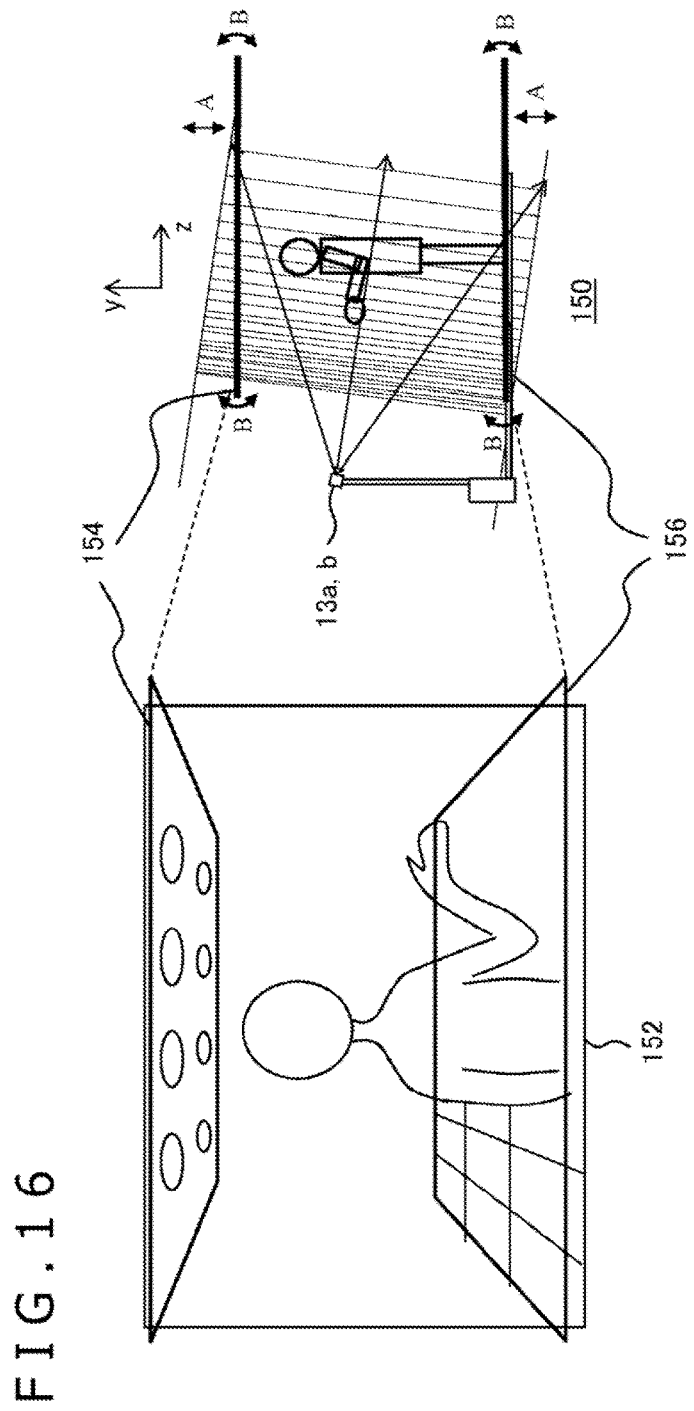
FIG. 16 is a diagram for describing a technique for detecting ceiling and floor planes in the present embodiment.

FIG. 16 is a diagram for describing a technique for detecting ceiling and floor planes in the present embodiment. A diagram at right in FIG. 16 is a schematic diagram 150 of the shooting environment as seen from side, and a diagram at left is a left image 152 shot in the shooting environment. A right image is shot in the same manner except that parallax occurs. However, the right image is omitted in FIG. 16. In such a shooting environment, a ceiling detection plane 154 and a floor detection plane 156 are defined in the same manner as has been done so far. The ceiling detection plane 154 is used to detect a ceiling plane, and the floor detection plane 156 is used to detect a floor plane. It should be noted, however, that unlike a case in which contact of a moving subject with a pre-defined detection plane is detected, an objective is to search for a motionless ceiling or floor plane. Therefore, the position and angle of the detection plane is changed in various ways.

Figure 17:
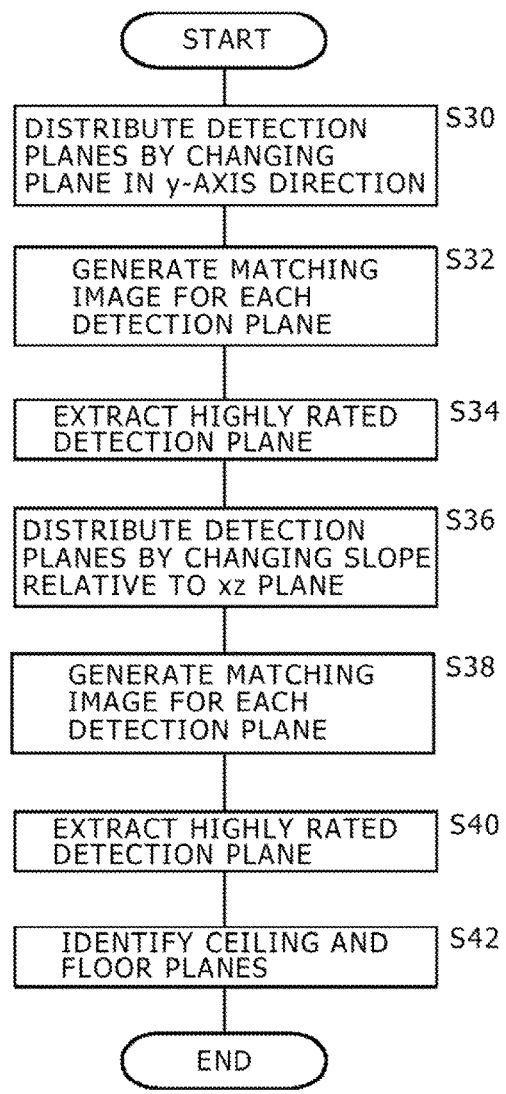
FIG. 17 is a flowchart illustrating a sequence of processes performed by the position information generation section to detect the ceiling and floor planes illustrated in FIG. 16.

FIG. 17 is a flowchart illustrating a sequence of processes performed by the position information generation section 46 to detect the ceiling and floor planes illustrated in FIG. 16. First, the detection plane definition portion 60 changes each of the ceiling detection plane 154 and the floor detection plane 156 vertically along the image (in the y-axis direction) over a given range, thus defining the plurality of ceiling detection planes 154 and the plurality of floor detection planes 156 (S30). That is, the plurality of detection planes are distributed at given intervals in the direction indicated by arrow A in FIG. 16. Then, the feature quantity calculation portion 62, the parallax correction area derivation portion 64, the area clipping portion 66, and the matching portion 68 perform the same processes as described above on each of the detection planes (S32). More specifically, the feature point image of the parallax correction area of the right image, obtained by moving the vertices according to the position in the depth direction, and the feature point image of the detection area of the left image are clipped, followed by matching and generation of a matching image.

Among feature points extracted at this time are lighting equipment on the ceiling, checkerboard pattern of joints of tiles or other building material, and carpet pattern. Next, the matching image for each detection plane is referenced so as to extract the detection plane having the largest number of feature points remaining, i.e., the detection plane having the overall highest matching rating across the image through comparison between the sums of matching ratings (S34). Then, the particularly highly rated area of the matching image for that detection plane is fixed, and a plurality of new detection planes are defined by changing the tilt relative to the horizontal plane of the image, i.e., an xz plane of the shooting space (S36).

That is, the plurality of detection planes are distributed at given angles in a direction indicated by arrow B in FIG. 16. At this time, a rotational axis may be determined using the search result in the direction indicated by arrow A, for example, by not changing the part of the matching image extracted in S34 having a particularly high matching rating as described above. Then, a matching image is generated for each of the detection planes in the same manner as in S32 (S38), after which the detection plane having the overall highest matching rating is extracted (S40). At this time, the detection plane serves as the ceiling or floor plane. It should be noted that the ceiling and floor planes need not be necessarily detected at the same time. In order to detect a wall plane, on the other hand, it is only necessary to distribute the detection planes by changing the detection plane horizontally along the image (in the x-axis direction) in S30 and changing the tilt relative to the vertical plane of the image, i.e., a yz plane of the shooting space in S36. All other processes are the same.

As has been described so far, the present embodiment can detect a relative relationship between a measurement target and a detection plane. Therefore, the present embodiment can be used in a variety of ways by defining a single detection plane or distributing a plurality of detection planes irrespective of a motion of the measurement target. A description will be given below of examples of using the present embodiment.

(1) Detection of a Horizontal or Vertical Plane

As described with reference to FIGS. 16 and 17, a horizontal or vertical plane that can serve as a reference in a shooting environment such as upper surface of a desk, seating surface of a chair, or upper surface of a stage, is detected in the same manner as ceiling, floor, and wall planes. When the ceiling, floor, and wall planes are detected, positions of other horizontal and vertical planes can be analogically approximated from a relationship with the distances to and angles with these planes. Then, these planes can be more efficiently detected by distributing detection planes at these positions in a concentrated manner.

Further, positions of intersection between the detected planes can be found. This makes it possible to analogically determine the upper limit in size of the object making up the horizontal and vertical planes. The detection of a long plane in the depth direction of a camera such as the ceiling or floor plane in a single step allows for highly accurate position detection by relying on the fact that the plane of interest is continuous with the highly accurate plane detected near the cameras.

(2) Position Search in Combination with Stereo Image Technique

As described above, the detection plane definition portion 60, for example, may generate a depth image by an ordinary stereo image technique, that is, by associating feature points between stereo images and calculating the position of the target in the depth direction from the parallax, and then define a detection plane using the depth image. For example, approximate positions of the body regions serving as targets such as a person's head, hand, and torso are derived from the depth image. Then, detection planes are distributed for each body region in a concentrated manner over a given range with the derived approximate distance at the center. Then, the detection planes are rated as described above. The position of each target is identified by extracting the detection plane with the highest matching rating.

(3) Interaction with Virtual Object

The present embodiment can be used to produce interaction between a subject and a virtual object, for example, by drawing a moving virtual object, causing the virtual object to fly over a hand of a person, the subject, and to jump up and down in step with the motion of the hand. At this time, the detection plane definition portion 60, for example, generates a simple depth image at a given rate, thus monitoring an approximate position of the target such as hand. Then, the virtual object is moved toward the target by ordinary graphics processing. When a distance to the target becomes smaller than a threshold, a detection plane is defined on the target.

In this case, it is necessary to move the detection plane to suit the motion of the target. Therefore, a plurality of detection planes are distributed near the target, thus acquiring detection planes with a high matching rating one after another. Then, when the virtual object reaches the detection plane, interaction is produced such as the virtual object being stopped or bounced back.

If an upper surface of a desk or a seating surface of a chair is the target, search is made for a horizontal plane near the desk or chair based on the depth image as described in (1). The desk or chair normally remains immobile. Therefore, the detection plane representing the horizontal plane obtained as a result of search can be used as a landing surface of the virtual object in an "as-is" manner. It should be noted that the output information generation section 50 draws a virtual object by an ordinary technique using the depth image and the detection result on the detection plane.

(4) Search for Model Shape Using Detection Planes

Figure 18:
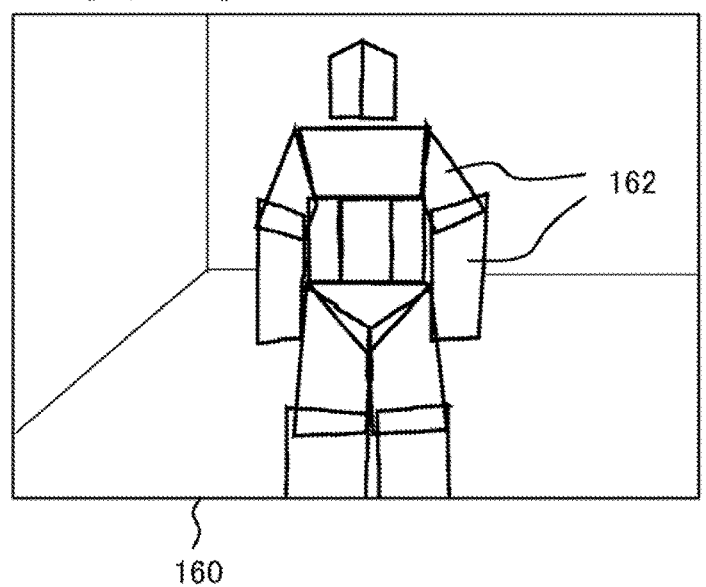
FIG. 18 is a diagram illustrating an example of defining a plurality of detection planes having model shapes tailored to a shape of a person as a whole in the present embodiment.

A model is constructed by using a plurality of detection planes in combination to suit a shape of the target to be identified such as overall picture or face of a person. FIG. 18 illustrates an example of defining a plurality of detection planes having model shapes tailored to the shape of a person as a whole. On an image plane 160, each of rectangles 162 making up a human model is a detection plane. It should be noted that the person serving as the subject is not shown assuming that the person overlaps this human model.

Such a model is prepared in advance. Then, model positions or postures, for example, are distributed over a given range based on the search result in the previous frame. Then, the shape having the highest matching rating is extracted, thus identifying the person's position or posture. It is possible to track not only the change in position but also the change in shape such as posture by repeating the above process every given number of frames. It should be noted that although the example shown in FIG. 18 is a comparatively complicated model, the model may be simplified or made more elaborate using a larger number of small detection planes according to a requested accuracy. For example, each of the face and the torso may be represented by a detection plane. Alternatively, the face may be divided into forehead, nose, cheeks, eyes, and so on so as to represent each of these with a different detection plane.

It should be noted that if the targets are hands, face, and so on whose angles relative to the cameras are likely to change, the detection planes having these as targets may be distributed so as to change the angles of the detection planes within a movable range as when search is made for the ceiling plane. Alternatively, even if the targets are the same, the approximate positions thereof may be acquired first by defining detection planes having a relatively large surface area, followed by acquisition of detailed information such as the positions and postures by defining a number of detection planes having a small surface area as illustrated in FIG. 18.

(5) Calibration Using Product Database

Figure 19:
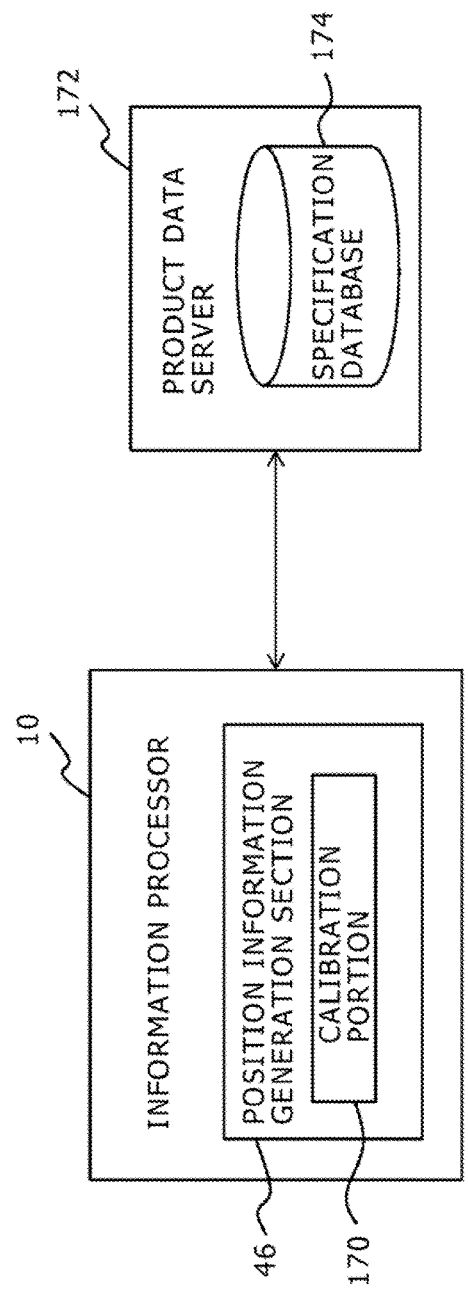
FIG. 19 is a diagram illustrating a system configuration used when the information processor is calibrated in the present embodiment.

The information processor 10 is calibrated using a product data server that supplies information including specifications such as shape and actual size of a product from a product label or other information. FIG. 19 illustrates a system configuration in that case. A product data server 172 is accessed from the information processor 10 via the network 18 illustrated in FIG. 1. The product data server 172 returns product information in response to a transmitted image such as product label or bar code. Alternatively, the system may be configured so that the information processor 10 acquires basic information such as product name, model number, and so on first by analyzing the image such as label or bar code and then transmits the information to the product data server 172 to receive product information from the same server 172.

The product data server 172 includes a specification database 174. The same database 174 stores product identification information in association with product information including shape and actual size. The product data server 172 acquires identification information of a product from an image such as label or basic information of the product transmitted from the information processor 10, acquiring, based on the basic information, product information from the specification database 174 and returning the product information to the information processor 10.

The information processor 10 includes the position information generation section 46 which in turn includes a calibration portion 170. It should be noted that the information processing system 2, the information processor 10, and the position information generation section 46 have the same components as those illustrated in FIGS. 1, 2, 3, and 7 except for the calibration portion 170. However, these components are not shown here. Upon acquisition of the image of the product's label included in the subject, the calibration portion 170 transmits the image data and basic information obtained therefrom to the product data server 172.

Upon acquisition of the product information from the product data server 172, the calibration portion 170 compares the actual vertical and horizontal size of the product acquired and an apparent size thereof as seen from the cameras in the shooting environment, thus identifying a distance from the cameras to the product. Then, a detection plane compatible with the shape of the product is established, followed by rating of matching between stereo images as described above.

In this case, the distance from the cameras to the product is known. Therefore, the generated matching image should have a high rating. Instead, however, the matching image has a low rating if there is an error in the misalignment amount based on the parallax which is used to find the parallax correction area of the right image. For this reason, the calibration portion 170 changes the misalignment amount used to find the parallax correction area of the right image in a plurality of ways, thus finding the misalignment amount that provides the highest rated matching image. This makes it possible to accurately derive a relationship between the distance from the cameras and the proper misalignment amount.

It should be noted that, in the above example, calibration was performed using an arbitrary product whose actual size is unknown but whose information is available from the product data server. On the other hand, calibration may be performed in the same manner using a product whose information relating to the actual size and shape is retained by the information processor 10. Alternatively, a product for calibration may be prepared in advance so that the same process can be performed by capturing that product.

In the present embodiment described above, two cameras are provided as an imaging device to shoot movies of a target from different viewpoints at the same time. Then, a detection plane is defined in the three-dimensional space of one of camera coordinate systems. Matching is performed between two images, i.e., the image of a detection area obtained by projecting a detection plane onto the image shot by one of the cameras, and the image of an area obtained by moving the same area of the image shot by the other camera by as much as the parallax based on the position of the detection plane in the depth direction. Then, it is determined that an object having a high matching rating exists at the position of the detection plane.

Defining a detection plane in a three-dimensional space, projecting the detection plane onto a two-dimensional image, and clipping images of a detection area and a parallax correction area and pasting them for use as an image for matching, are comparable to modeling, coordinate conversion, and texture reading in computer graphics process. Therefore, it is possible to use resources suitable for image processing such as GPU. Then, an input image resolution, a density at which the detection planes are arranged, the resolution at the time of reading the areas, and a matching image resolution, can be specified independently of each other. This makes it possible to properly control an image plane direction and a detection accuracy of a depth direction according to processing load and application purpose.

Further, GPU buffers are allocated properly according to resolution, thus ensuring efficiency in processing and resource use. By using computer graphics processing functions, it is possible to combine two tasks, i.e., specifying an area of interest including detection planes in designing games and other content and specifying a design level of a model such as virtual object, thus facilitating content creation. Further, a position in a depth direction is specified in a three-dimensional space in advance, followed by inverse calculation of the parallax at that position. As a result, a rounding error is less likely to occur than if a conventional stereo matching technique is used in which the position in the depth direction is calculated from the parallax found on a pixel-by-pixel basis. This is particularly effective for an object located far away from the cameras.

Still further, in contrast to a conventional stereo matching technique which performs matching to extract corresponding points by moving a search window across a block area of a reference image only over a range where parallax is likely to occur, the technique according to the present embodiment does not require a movement of a search window. Still further, only a partial detection area is subjected to processing, significantly reducing processing load. Still further, it is possible to select a proper processing system according to the application purpose of detection result, shooting environment, processing capabilities of the processor and devices, and so on by adding or removing processes, i.e., changing the number of detection planes and minimizing erroneous determination caused by patterns of a background object.

Thus, the embodiment of the present invention has been described above. It should be understood by those skilled in the art that the above embodiment is illustrative, that the combination of components and processes can be modified in various ways, and that such modification examples also fall within the scope of the present invention.

In the present embodiment, for example, detection planes are defined primarily in the three-dimensional camera coordinate system of the first camera 13a. On the other hand, detection planes may be defined in a coordinate system other than the camera coordinate system of the first or second camera 13a or 13b. For example, a third camera may be provided separately to shoot a high resolution image for display so that detection planes are defined in the three-dimensional coordinate system of this camera. Alternatively, detection planes may be defined in a three-dimensional camera coordinate system specified for graphics drawing in AR display or other application. In such a case, it is also possible to detect a subject located on a detection plane by projecting the detection plane onto the plane of the image shot by the first or second camera 13a or 13b and moving the other image by as much as the parallax appropriate to the distance from these cameras to the detection plane for matching as in the present embodiment.

REFERENCE SIGNS LIST

2 Information processing system, 10 Information processor, 12 Imaging device, 16 Display device, 13a First camera, 13b Second camera, 22 CPU, 24 GPU, 26 Main memory, 42 Image acquisition section, 44 Input information acquisition section, 46 Position information generation section, 48 Image storage section, 50 Output information generation section, 60 Detection plane definition portion, 62 Feature quantity calculation portion, 64 Parallax correction area derivation portion, 66 Area clipping portion, 68 Matching portion, 70 Position information output portion, 170 Calibration portion, 172 Product data server, 174 Specification database

INDUSTRIAL APPLICABILITY

As described above, the present invention is applicable to computers, image processors, image display devices, game consoles, and other information processors.

The invention claimed is:

1. An information processor for detecting a position of a measurement target in a three-dimensional space using shot images, the information processor comprising:
   an image acquisition section adapted to acquire stereo image data obtained by capturing the measurement target in parallel with a first camera and a second camera that are arranged at a given distance from each other;
   a position information generation section that establishes a detection plane and identifies a subject position based on a positional relationship between the detection plane and an image of the subject shot by the first camera;
   a detection plane definition portion adapted to define said detection plane in the three-dimensional space and establish a detection area obtained by calculating vertex coordinates of the detection area by projecting the detection plane onto a plane of the image shot by the first camera;
   a parallax correction area derivation portion adapted to derive a parallax correction area in an image shot by the second camera by moving the same area as the detection area in a direction of eliminating parallax, wherein the parallax correction area is obtained by moving, to the left, an area of a right image shot by the second camera identical to the detection area of a left image shot by the first camera by as much as a parallax corresponding to the position of the detection plane in a z (depth) direction, where the parallax is defined according to the formula: $L*(W/w)*(1/Z)=C/Z$, where Z is the distance to the measurement target in the depth direction, C is a value determined by the first or second camera based on its setting, L is the distance between the first and second cameras, W is a horizontal pixel count of the first or second camera, and w is a horizontal range of view field of a real space when Z is 1;
   a feature quantity calculation portion adapted to perform a process on the left and right images to derive a given feature quantity, thus generating a feature point image defined by a region with a feature quantity that is discriminated from other regions;
   an area clipping portion adapted to clip the detection area of the left image and the parallax correction area of the right image of the left and right images, thus generating two images for matching;
   a matching portion adapted to perform matching between the left and right images, thus deriving a feature point that is considered to exist at the same position in the left and right images, wherein the region having said feature point represents the subject existing at the position of the detection plane; and
   a detection result output section adapted to output a result of matching performed by the matching portion.

2. The information processor of claim 1, wherein when the position of the detection plane in the z direction is different across the detection plane, the parallax correction area derivation portion derives the parallax correction area by calculating a parallax for each of vertices of the same area as the detection area in the image shot by the second camera and moving each of the vertices by as much as the parallax.

3. The information processor of claim 1, wherein the area clipping portion is adapted to perform texture mapping to ensure that the image of the detection area of the image shot by the first camera and the image of the parallax correction area of the image shot by the second camera are of the same size.

4. The information processor of claim 1, wherein
   the detection plane definition portion defines a plurality of detection planes over a given range in the three-dimensional space,
   the parallax correction area derivation portion derives the parallax correction area for each of the detection planes,
   the matching portion performs the matching for each of the detection planes, and
   the detection result output section extracts a detection plane having the highest matching rating and determines that the measurement target is located on the extracted detection plane.

5. The information processor of claim 4, wherein
   the detection plane definition portion defines the plurality of detection planes at different rotational angles relative to a given axis in the three-dimensional space.

6. The information processor of claim 1, wherein
   the image acquisition section acquires stereo images shot at a given frame rate, and
   the matching portion performs matching after disabling an area of each image other than a motion area using a motion difference image generated by comparison with an image shot by the same camera at the previous time.

7. The information processor of claim 1, wherein
   the detection plane definition portion defines a plurality of detection planes, each for one of a plurality of measurement targets,
   the parallax correction area derivation portion derives the parallax correction area for each of the detection planes, and
   the matching portion produces a matching result for each measurement target by performing the matching for each of the detection planes and disabling, of all points having a matching rating higher than a threshold on one detection plane, a point also having a predetermined matching rating on the other detection plane.

8. The information processor of claim 1, wherein
   the matching portion identifies a point having a matching rating higher than a threshold as a part serving as a measurement target existing on the detection plane, the information processor further comprising:
   an output information generation section adapted to draw a virtual object on a shot image and display the virtual object on a display device in such a manner that when the part serving as the measurement target exists on the detection plane, the virtual object part of whose front face is the same plane as the detection plane interacts with the measurement target.

9. The information processor of claim 1, wherein
   the detection plane definition portion performs stereo matching, adapted to extract corresponding points and calculate the position of the measurement target in the z direction from the parallax therebetween, on stereo images obtained by reducing the resolution of the stereo images, acquires the position of the measurement target from the result of the stereo matching, and determines the position of the detection plane based on the position of the measurement target.

10. The information processor of claim 4, wherein
    the image acquisition section acquires the stereo images shot at a given frame rate, and
    the detection plane definition portion determines the positions of a plurality of detection planes based on the position of the measurement target determined for the stereo images at the previous time.

11. The information processor of claim 1, further comprising:

a calibration portion adapted to acquire the position of the measurement target in the z direction by acquiring an actual size of the measurement target from a database and comparing an apparent size in the shot image and the actual size, define a detection plane at that position, perform matching by changing how much the parallax correction area is moved, and correct a relationship between the position in the z direction and how much the parallax correction area is moved by extracting how much the parallax correction area is moved which provides proper matching rating.

12. An information processing method used by an information processor for detecting a position of a measurement target in a three-dimensional space using shot images, the information processing method comprising:

acquiring stereo image data obtained by capturing the measurement target in parallel with first and second cameras that are arranged at a given distance from each other;

defining a detection plane in the three-dimensional space and establishing a detection area obtained by calculating vertex coordinates of the detection area when the detection plane is projected onto an image shot by the first camera;

deriving a parallax correction area in an image shot by the second camera by moving the same area as the detection area in a direction of eliminating parallax, wherein the parallax correction area is obtained by moving, to the left, an area of a right image shot by the second camera identical to the detection area of a left image shot by the first camera by as much as a parallax corresponding to the position of the detection plane in a z (depth) direction, where the parallax is defined according to the formula: $L*(W/w)*(1/Z)=C/Z$, where Z is the distance to the measurement target in the depth direction, C is a value determined by the first or second camera based on its setting, L is the distance between the first and second cameras, W is a horizontal pixel count of the first or second camera, and w is a horizontal range of view field of a real space when Z is 1;

performing a process on the left and right images to derive a given feature quantity, thus generating a feature point image defined by a region with a feature quantity that is discriminated from other regions;

clipping the detection area of the left image and the parallax correction area of the right image of the left and right images, thus generating two images for matching performing matching between the left and right images, thus deriving a feature point that is considered to exist at the same position in the left and right images, wherein the region having said feature point represents the subject existing at the position of the detection plane;

outputting a matching result; and generating an image using the matching result and displaying the image on a display device.

13. A computer executing a computer program, which causes the computer to execute actions for detecting a position of a measurement target in a three-dimensional space using shot images, the program causing the computer to execute the actions of:

acquiring stereo image data obtained by capturing the measurement target in parallel with first and second cameras that are arranged at a given distance from each other;

defining a detection plane in the three-dimensional space and establishing a detection area obtained by calculating vertex coordinates of the detection area when the detection plane is projected onto an image shot by the first camera;

deriving a parallax correction area in an image shot by the second camera by moving the same area as the detection area in a direction of eliminating parallax, wherein the parallax correction area is obtained by moving, to the left, an area of a right image shot by the second camera identical to the detection area of a left image shot by the first camera by as much as a parallax corresponding to the position of the detection plane in a z (depth) direction, where the parallax is defined according to the formula: $L*(W/w)*(1/Z)=C/Z$, where Z is the distance to the measurement target in the depth direction, C is a value determined by the first or second camera based on its setting, L is the distance between the first and second cameras, W is a horizontal pixel count of the first or second camera, and w is a horizontal range of view field of a real space when Z is 1;

performing a process on the left and right images to derive a given feature quantity, thus generating a feature point image defined by a region with a feature quantity that is discriminated from other regions;

clipping the detection area of the left image and the parallax correction area of the right image of the left and right images, thus generating two images for matching;

performing matching between the left and right images, thus deriving a feature point that is considered to exist at the same position in the left and right images, wherein the region having said feature point represents the subject existing at the position of the detection plane; and outputting a matching result.

14. A non-transitory computer-readable recording media storing a computer program for causing a computer to execute actions for detecting a position of a measurement target in a three-dimensional space using shot images, the program causing the computer to execute the actions of:

acquiring stereo image data obtained by capturing the measurement target in parallel with first and second cameras that are arranged at a given distance from each other;

defining a detection plane in the three-dimensional space and establishing a detection area obtained by calculating vertex coordinates of the detection area when the detection plane is projected onto an image shot by the first camera;

deriving a parallax correction area in an image shot by the second camera, by moving the same area as the detection area in a direction of eliminating parallax, wherein the parallax correction area is obtained by moving, to the left, an area of a right image shot by the second camera identical to the detection area of a left image shot by the first camera by as much as a parallax corresponding to the position of the detection plane in a z (depth) direction, where the parallax is defined according to the formula: $L*(W/w)*(1/Z)=C/Z$, where Z is the distance to the measurement target in the depth direction, C is a value determined by the first or second camera based on its setting, L is the distance between the first and second cameras, W is a horizontal pixel count of the first or second camera, and w is a horizontal range of view field of a real space when Z is 1;

performing a process on the left and right images to derive a given feature quantity, thus generating a feature point image defined by a region with a feature quantity that is discriminated from other regions;

clipping the detection area of the left image and the parallax correction area of the right image of the left and right images, thus generating two images for matching performing matching between the left and right images, thus deriving a feature point that is considered to exist at the same position in the left and right images, wherein the region having said feature point represents the subject existing at the position of the detection plane; and outputting a matching result.

15. The information processor of claim 1, wherein a virtual object is drawn on a front side of the defined detection plane, and the subject is tracked by distributing detection planes in a concentrated manner based on the detection result from a previous time.

16. The information processor of claim 1, wherein images shot by the first and second cameras are misaligned by as much as parallax and the feature quantity calculation portion determines whether or not feature points of the same shape are located at the same position, thus determining whether or not the measurement target is located at the position of the detection plane.

17. The information processor of claim 1, wherein a misalignment amount is applied by manipulating all vertex coordinates of the detection area independently.

18. The information processor of claim 1, wherein the frame rates at which an image shot by the first camera and that shot by the second camera are specified independently.

19. The information processor of claim 1, wherein the distance Z is set to an arbitrary value and the parallax is derived for distance Z set to the arbitrary value.

20. The information processor of claim 1, wherein the distance Z corresponds to the position of the detection plane in the depth direction and the parallax is derived for this value of Z.

* * * * *